United States Patent
Motohashi

(10) Patent No.: US 6,351,639 B1
(45) Date of Patent: Feb. 26, 2002

(54) TELEPHONE WHOSE SETTING DETAILS CAN BE CHANGED, AND TELEPHONE CAPABLE OF CHANGING SETTINGS OF CALLED TELEPHONE

(75) Inventor: Kazutoshi Motohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/394,772

(22) Filed: Sep. 10, 1999

(30) Foreign Application Priority Data

Oct. 27, 1998 (JP) .......................................... 10-305928

(51) Int. Cl.$^7$ ................................................ H04Q 7/14
(52) U.S. Cl. ....................... 455/420; 455/414; 455/419; 379/201.02
(58) Field of Search ................................ 455/414, 432, 455/418, 419, 420; 379/201.07, 201.08, 201.02, 201.03

(56) References Cited

U.S. PATENT DOCUMENTS 5,802,467 A * 9/1998 Salazar et al. ............... 455/420
5,854,978 A * 12/1998 Heidari ........................ 455/418
5,864,757 A * 1/1999 Parker ......................... 455/418

FOREIGN PATENT DOCUMENTS

JP 5-175920 7/1993

* cited by examiner

Primary Examiner—Daniel Hunter
Assistant Examiner—Tuan Tran
(74) Attorney, Agent, or Firm—Rosenman & Colin LLP

(57) ABSTRACT

The present invention is directed to technology relating to a telephone whose settings can be changed and a telephone capable of changing settings of a called telephone. A portable cellular phone includes function setting request receiving means for receiving from the calling telephone a function setting request added to call setting information, setting changing means capable of changing setting details according to the function setting request received by the function setting request receiving means, and control means capable of refusing the function setting request to change the settings received from the setting changing means, when the function setting request is not acceptable. By means of this configuration, the portable cellular phone enables the user of the called telephone to select whether or not to allow the calling telephone to change settings regarding a ring tone or activation/deactivation of a call vibrator of the called telephone, thereby avoiding inconvenient changing of settings, and permits changing of settings without introducing an element of inconvenience.

8 Claims, 18 Drawing Sheets

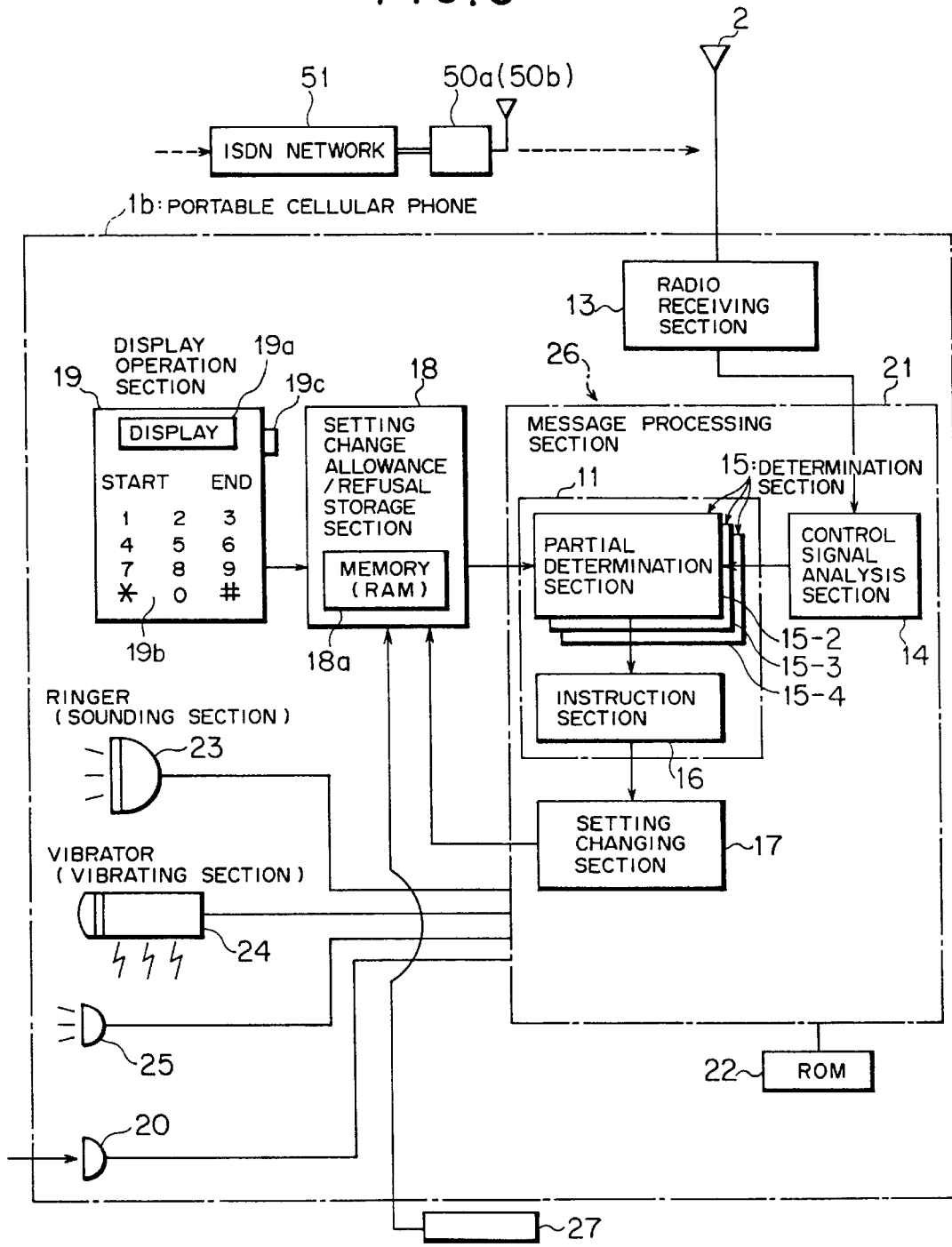

FIG. 6(a)

| |
|---|
| PROTOCOL DISCRIMINATOR(CC) |
| ADDITIONAL SERVICE IDENTIFIER, CALL REFERENCE |
| TYPE OF MESSAGE (SETUP) |
| BEARER CAPABILITY (SOUND) |
| CALLING PHONE NUMBER (PHONE NUMBER OF CALLING PARTY) |
| USER-TO-USER INFORMATION (SETTING CHANGE REQUEST INFORMATION) ~30a |

| | | |
|---|---|---|
| INFORMATION ELEMENT IDENTIFIER = USER-TO-USER INFORMATION (7E) | | OCTET 1 |
| LENGTH OF INFORMATION ELEMENT = 03h | | OCTET 2 |
| 000000 | SETTING CHANGE REQUEST INCLUDED (10) / NOT INCLUDED (00) | OCTET 3 |
| 000000 | RINGING TONE SETTING REQUEST INCLUDED (1) / NOT INCLUDED (0) VIBRATOR SETTING REQUEST INCLUDED (1) / NOT INCLUDED (0) | OCTET 4 |
| 000000 | RINGING TONE ACTIVATED (1) / DEACTIVATED (0) VIBRATOR ACTIVATED (1) / DEACTIVATED (0) | OCTET 5 |

*1 CHECK VALUE OF OCTET 3 IN USER-TO-USER INFORMATION
  [SHOWN IN FIG.6(b)]
*2 CHECK VALUE OF OCTET 4 IN USER-TO-USER INFORMATION
  [SHOWN IN FIG.6(b)]
*3 IF VALUE OF OCTET 5 IS 1X, ACTIVATE RINGING TONE.
  IF VALUE OF OCTET 5 IS 0X, DEACTIVATE RINGING TONE.
*4 IF VALUE OF OCTET 5 IS X1, ACTIVATE VIBRATOR.
  IF VALUE OF OCTET 5 IS X0, DEACTIVATE VIBRATOR.

FIG. 11

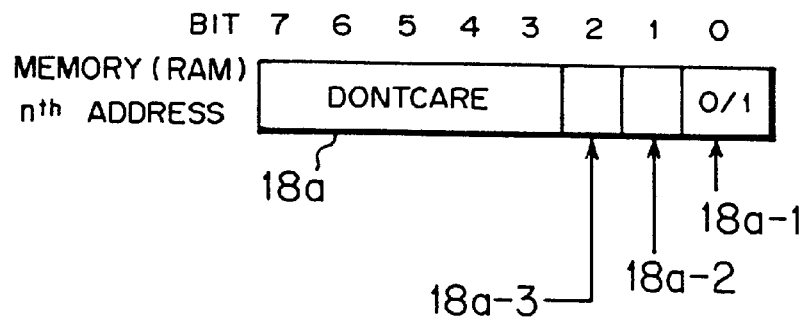

18a-1 : BIT FOR STORING ALLOWANCE / REFUSAL INFORMATION
  0 : OFF ( REQUEST TO CHANGE REFUSED )
  1 : ON ( REQUEST TO CHANGE ALLOWED )

18a-2 : BIT FOR STORING INFORMATION AS TO WHETHER OR NOT RINGING TONE CHANGE REQUEST IS ACCEPTABLE
  0 : OFF ( REQUEST TO CHANGE REFUSED )
  1 : ON ( REQUEST TO CHANGE ALLOWED )

18a-3 : BIT FOR STORING INFORMATION AS TO WHETHER OR NOT VIBRATOR CHANGE REQUEST IS ACCEPTABLE
  0 : OFF ( REQUEST TO CHANGE REFUSED )
  1 : ON ( REQUEST TO CHANGE ALLOWED )

FIG. 13

| BYTE | 0 | 1 | 2 | 3 | 4 | 5 | 6 | 7 | 8 | 9 |
|---|---|---|---|---|---|---|---|---|---|---|
| MEMORY (RAM) $n^{th}$ ADDRESS | 0 | 4 | 4 | 7 | 7 | 7 | 1 | 1 | 1 | 1 |
| n+10 ADDRESS | 0 | 4 | 4 | 7 | 4 | 0 | 1 | 1 | 1 | 1 |
| n+20 ADDRESS | 0 | 3 | 7 | 7 | 7 | 7 | 1 | 1 | 1 | 1 |
| n+30 ADDRESS | NULL ( VACANT AREA ) | | | | | | | | | |
| n+40 ADDRESS | NULL ( VACANT AREA ) | | | | | | | | | |

18b

↑ STORE PHONE NUMBERS

FIG. 15

| BYTE | 0 2 4 6 | 8 9 10 11 12 | |
|---|---|---|---|
| MEMORY (RAM) | | | |
| n<sup>th</sup> ADDRESS | AAA0000 | ! # A B C | 18c |
| n+14 ADDRESS | AAB0001 | A B C # # | |
| n+28 ADDRESS | NULL | NULL | |
| n+42 ADDRESS | NULL | NULL | |
| n+56 ADDRESS | NULL | NULL | |

↑ STORE IDs  ↑ STORE PASSWORDS

FIG. 16

| | | |
|---|---|---|
| INFORMATION ELEMENT IDENTIFIER = USER-TO-USER INFORMATION ( 7E ) | | OCTET 1 |
| LENGTH OF INFORMATION ELEMENT = OF h | | OCTET 2 |
| 000000 | SETTING CHANGE REQUEST INCLUDED ( 10 ) / NOT INCLUDED ( 00 ) | OCTET 3 |
| 000000 | RINGING TONE REQUEST INCLUDED ( 1 ) / NOT INCLUDED ( 0 ) VIBRATOR REQUEST INCLUDED ( 1 ) / NOT INCLUDED ( 0 ) | OCTET 4 |
| 000000 | RINGING TONE ACTIVATED ( 1 ) / DEACTIVATED ( 0 ) VIBRATOR ACTIVATED ( 1 ) / DEACTIVATED ( 0 ) | OCTET 5 |
| SET ID ( IA5 CHARACTER ) EXAMPLE " AAA000 " | | OCTETS 6 TO 12 |
| SET PASSWORD ( IA5 CHARACTER ) EXAMPLE " !#ABC " | | OCTETS 13 TO 17 |

| | | |
|---|---|---|
| INFORMATION ELEMENT IDENTIFIER = USER-TO-USER INFORMATION (7E) | | OCTET 1 |
| LENGTH OF INFORMATION ELEMENT = 0Bh | | OCTET 2 |
| 000000 | SETTING CHANGE REQUEST<br>INCLUDED (10) / NOT INCLUDED (00) | OCTET 3 |
| 000000 | RINGING TONE REQUEST<br>INCLUDED (1) / NOT INCLUDED (0)<br>VIBRATOR REQUEST<br>INCLUDED (1) / NOT INCLUDED (0) | OCTET 4 |
| 000000 | RINGING TONE<br>ACTIVATED (1) / DEACTIVATED (0)<br>VIBRATOR<br>ACTIVATED (1) / DEACTIVATED (0) | OCTET 5 |
| BIT PATTERN FOR IDENTIFYING PRIVILEGE<br>EXAMPLE " 1A2B596BF3EE9F03 " (IN HEXADECIMAL) | | OCTETS 6 TO 13 |

30a

TELEPHONE WHOSE SETTING DETAILS CAN BE CHANGED, AND TELEPHONE CAPABLE OF CHANGING SETTINGS OF CALLED TELEPHONE

BACKGROUND OF THE INVENTION (1) Field of the Invention

The present invention relates to a telephone whose setting details (hereinafter referred to simply as "settings") can be changed and to a telephone capable of changing settings of a called telephone, both telephones belonging to a communications network, whereby settings of the called telephone can be changed by means of transmission of a request from a calling telephone to the called telephone.

(2) Description of the Related Art

An Integrated Service Digital Network (ISDN) that has been put into actual use as a network for next generation communications enables higher speed, higher quality, and less expensive communications, as compared with communications offered by an analog network, and has been used in various fields. Since many terminals are connected to the ISDN, items to be tested for checking normality of individual terminals are available for effecting control, maintenance, and network management. To this end, each of the terminals has a large number of functions capable of testing the items. At the time of testing individual terminals connected to the ISDN, the terminals are configured so that they can be tested by means of maintenance signals transmitted to the terminals from a remote maintenance center, without maintenance technicians having to take the trouble to visit the terminals.

The remote control technique required for such remote maintenance is described in Japanese Patent Application Laid-Open No. HEI05-175920. This publication describes a remote maintenance technique for use with an ISDN terminal system for remotely and intensively maintaining ISDN terminals through use of "user-to-user information acknowledgement" offered over the ISDN. The technique described in Japanese Patent Application Laid-Open No. HEI05-175920 relates to a remote maintenance method for use with an ISDN terminal system; the method is designed so as to enable remote maintenance of even a circuit switching capable of establishing connection among an indefinite number of terminals, without interrupting data communication or imposing limitations on the network service. In parallel with data communications over a user data channel (B channel), maintenance is carried out through exchange of maintenance data employing user-to-user information contained in call setting information (or a call setting message).

Therefore, if request data, which represent the details of changes, are transmitted from the calling telephone over the ISDN while included in a user-to-user information element of the call setting information, the calling party enables automatic changing of the settings of the called telephone according to the request. For instance, if the called party does not answer at all even when the called telephone rings over and over again, the calling party effects an increase in the volume of the ring or the degree of vibration of the called telephone.

However, from the point of view of the called party who receives the change request, unauthorized changing of the settings of his called telephone introduces an element of confusion. For example, if the volume of the ring sound is increased without authorization, the user of the called telephone will be subjected to great inconvenience during a meeting or in another setting where loud ring sound is not acceptable. Further, if the settings effected by the user are changed without authorization, the user may experience great difficulty in using his telephone.

SUMMARY OF THE INVENTION

The present invention has been conceived to solve such a problem, and the object of the present invention is to provide a telephone whose settings can be changed and a telephone capable of changing settings of a called telephone, both of which enable the user of the called telephone to select whether or not to permit the calling telephone to change settings regarding a ring sound or activation/deactivation of a call vibrator of the called telephone, thereby avoiding inconvenient changing of settings; and which permit changing of settings without introducing an element of inconvenience.

To this end, according to a first aspect of the present invention, there is provided a telephone whose settings can be changed, comprising, function setting request receiving means for receiving from the calling telephone a function setting request added to call setting information, setting changing means capable of changing setting details according to the function setting request received by the function setting request receiving means, and control means capable of refusing the function setting request to change the settings received from the setting changing means, when the function setting request is not acceptable.

By means of such a configuration, the called party can accept or refuse a request to change settings, as the case may be. For example, the called party may accept or unconditionally refuse a request by the calling telephone to change settings, such as changing of a ringing tone or activation/deactivation of a call vibrator. As a result, the called telephone can permit changing of settings without introducing an element of inconvenience or can avoid inconvenient changing of settings. The present invention yields an advantage of the ability to enhance the ease of use of the telephone.

Preferably, the control means may be configured so as to allow a function setting request when the function setting request is transmitted from a telephone having specific information.

Consequently, the called telephone can permit changing of settings without introducing an element of inconvenience but avoid inconvenient changing of settings. Thus, the present invention yields the advantage of the ability to enhance the ease of use of the telephone.

Preferably, the control means may be configured so as to allow a function setting request when the function setting request is transmitted from a telephone having a specific phone number as specific information. Alternatively, the control means may be configured so as to allow a function setting request when the function setting request is transmitted from a telephone having specific identification information as specific information. Further, alternatively, the control means may be configured so as to allow a function setting request when the function setting request is transmitted from a telephone which has previously been given specific identification information as specific information.

Accordingly, by means of such a configuration, the called telephone becomes able to accept or refuse a changing request individually with regard to a ringing tone or a call vibrator. For instance, in very peaceful surroundings, the called telephone can prevent changing of a ringing tone but permit changing of only settings of the vibrator. Thus, control of individual settings becomes feasible, and acceptable conditions can be set individually for a ringing tone and for the vibrator. For example, only the limited number of persons who know identification information or a password can be allowed to change a ringing tone. Further, so long as a calling phone number is reported, anybody can change the settings of the vibrator. Thus, elaborate control of settings of the called telephone becomes possible.

Preferably, in a case where the function setting request comprises a plurality of setting requests and where some of the function setting requests and where some of the individual function setting request are not acceptable, the control means is configured so as to refuse requests that the setting changing means should change settings according to the corresponding function setting requests.

Consequently, such a configuration also enables separated control of settings, thus realizing elaborate control.

Preferably, the telephone may be provided with criteria-for-evaluation setting means which sets, by use of external input means, criteria-for-evaluation information as to whether or not the function setting request is allowed.

Accordingly, such a criteria-for-evaluation means enables simple realization of complicated setting.

Further, according to a second aspect of the present invention, there is provided a telephone capable of changing settings of a called telephone, comprising, function setting request addition means for adding to call setting information a function setting request for changing the settings of the called telephone, and specific information addition means which, upon addition of the function setting request by the function setting request addition means, adds to the call setting information specific information capable of allowing changing of settings of the called telephone on the basis of the function setting request.

Accordingly, such a configuration offers an advantage of enabling the calling party to automatically change the settings of the called telephone according to the requirements over, e.g., an ISDN.

BRIEF DESCRIPTION OF THE DRAWINGS

FIG. 5 is a functional block diagram of a portable called cellular phone according to one embodiment of the present invention;

FIG. 6(a) is a diagram for describing the format of a call setting message;

FIG. 6(b) is a diagram for describing the format of user-to-user information;

FIG. 11 is a diagram for describing another location of memory of the called telephone where allowance/refusal information is set, according to one embodiment of the present invention;

FIG. 13 is a diagram for describing information items stored in memory location;

FIG. 15 is a diagram for describing information items stored in another location of the memory;

FIG. 16 is a diagram for describing the format of a user-to-user information area when a determination is made as to whether or not identification information is acceptable;

FIG. 18 is a diagram for describing the format of a user-to-user information region when privileged changing is set.

DESCRIPTION OF THE PREFERRED EMBODIMENT

An embodiment of the present invention will be described hereinbelow by reference to the accompanying drawings.

(A) Description of an Embodiment of the Present Invention

Figure 1:
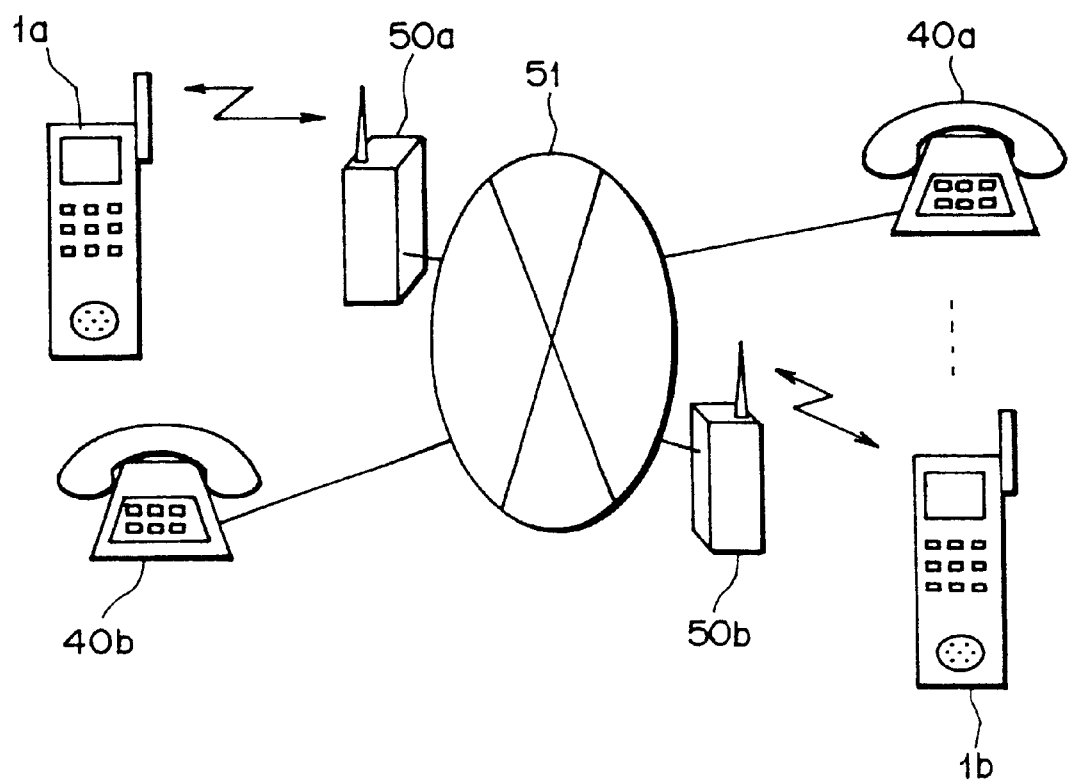
FIG. 1 is a schematic representation showing an ISDN system comprising a telephone whose settings can be changed and a telephone capable of changing settings of a called telephone, wherein both telephones fall within the scope of the present invention.

FIG. 1 is a schematic representation showing an ISDN system comprising a telephone whose settings can be changed and a telephone capable of changing settings of a called telephone, wherein both telephones fall within the scope of the present invention. As shown in FIG. 1, the system comprises portable cellular phones 1a and 1b, radio base stations 50a and 50b, and an ISDN 51. The portable cellular phones 1a and 1b are connected to the ISDN 51 by way of the radio base stations 50a and 50b, respectively. Further, stationary telephones 40a and 40b are also connected to the ISDN 51.

The portable cellular phones 1a and 1b correspond to telephones whose settings can be changed, and the stationary telephones 40a and 40b correspond to telephones capable of changing settings of a called telephone, both types of telephones falling within the scope of the present invention. The radio base stations 50a and 50b receive radio signals, and the thus-received signals are processed into call signals and transmitted to the ISDN 51. Further, the radio base stations 50a and 50b receive call signals transmitted from the ISDN 51, and the call signals are processed and converted into radio signals. The thus-converted radio signals are then transmitted. To establish communication between the portable cellular phone 1a and the portable cellular phone 1b, a calling party makes a call through use of; e.g., the portable cellular phone 1a, and the resultant radio signal is received and processed by the radio base station 50a. The thus-processed call signal is transmitted in the form of a radio signal from the radio base station 50b by way of the ISDN 51. A called party receives the radio signal by use of his portable cellular phone 1b, thereby establishing voice communication.

Throughout the following description, the portable cellular phone 1a corresponds to a calling telephone, and the portable cellular phone 1b corresponds to a called telephone. Alternatively, as shown in FIG. 1, either the stationary telephone 40a or 40b may correspond to the calling telephone, and the other may correspond to the called telephone. The present invention may be applied to the respective cases where a call is placed by the stationary telephone 40a or 40b to the portable cellular phone 1a or 1b, where a call is placed by the stationary telephone 40a to the stationary telephone 40b, and where a call is placed by the portable cellular phone 1a or 1b to the stationary telephone 40a or 40b.

When a call is placed by the portable cellular phone 1a to the portable cellular phone 1b, signals are sequentially exchanged between the portable cellular phones 1a and 1b and the ISDN 51 according to a protocol, such as channel allocation, over a signal channel (e.g., a D channel or a corresponding radio channel) before voice communication is established over a user information channel (e.g., a B channel or a corresponding radio channel). While information representing details of changes of the called telephone is contained in a call setting message, the calling party can transmit the call setting message over the ISDN 51.

Signals are exchanged according to the following sequence. First, when a call setting (SETUP) message is transmitted to the ISDN 51 from the portable cellular phone 1a, a call setting acceptance signal (CALL PROC) is returned to the portable cellular phone 1a from the ISDN 51. Further, a call setting message is transmitted to the portable cellular phone 1b from the ISDN 51. If the portable cellular phone 1b responds to the call, a response (CONN) message is returned to the ISDN 51 from the portable cellular phone 1b. In response to return of the response message, another response message is returned to the portable cellular phone 1a from the ISDN 51. Further, a response acknowledgement (CONN ACK) message is transmitted to the portable cellular phone 1b from the ISDN 51. At this time, telephone communication is commenced between the calling party having the portable cellular phone 1a and the called party having the portable cellular phone 1b.

Thus, according to the above-described sequence, the calling party can change settings of the called telephone by transmitting the call setting message by way of the ISDN 51 while the information representing details of changes of the called telephone is included in the call setting message.

Figure 2:
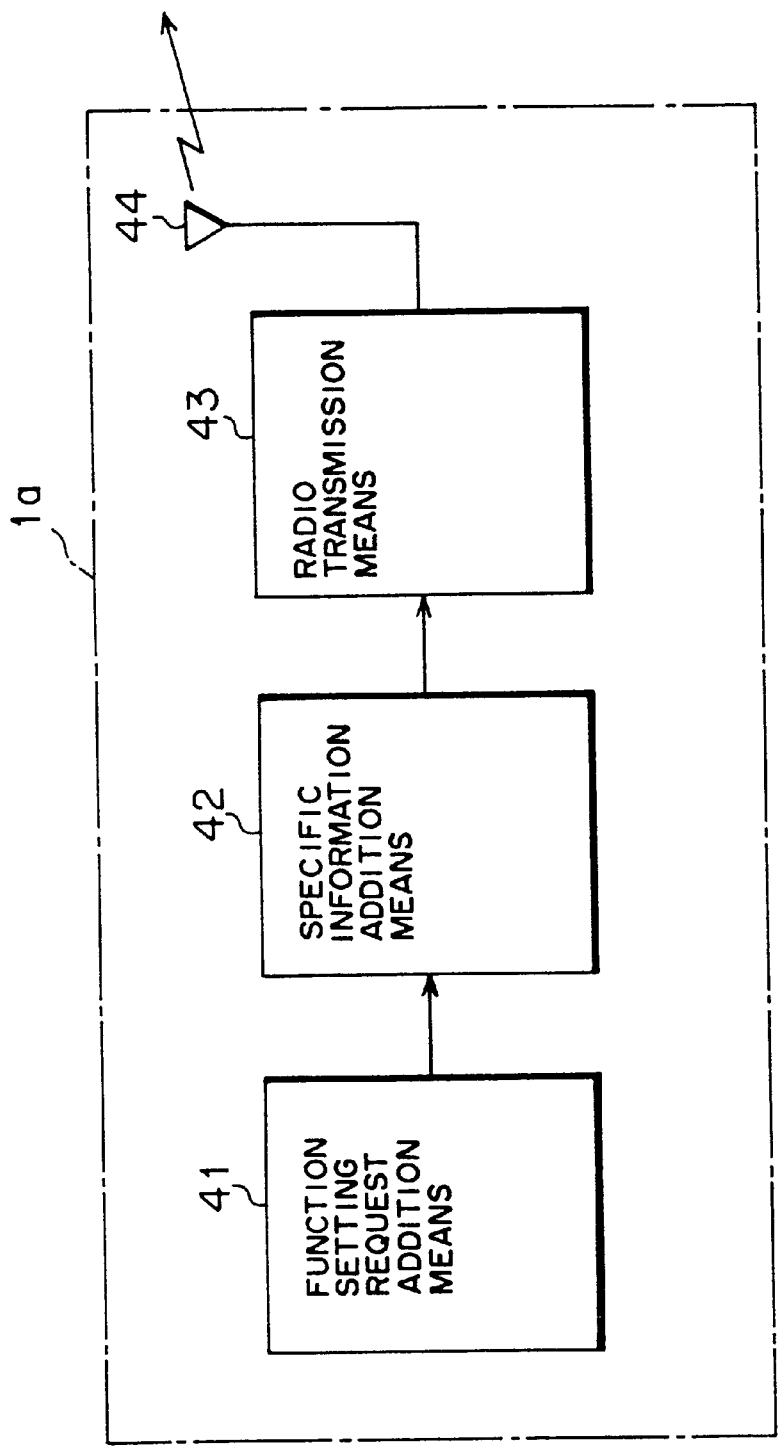
FIG. 2 is a functional block diagram of a calling telephone according to one embodiment of the present invention.

FIG. 2 is a functional block diagram of a calling telephone (capable of changing settings of a called telephone) according to one embodiment of the present invention. As shown in FIG. 2, the calling telephone (i.e., the portable cellular phone 1a) is capable of changing settings of the called telephone and comprises function setting request addition means 41, specific information addition means 42, radio transmission means 43, and a transmission antenna 44.

The function setting request addition means 41 adds to the call setting message (call setting information) a function setting request for changing the settings of the called telephone. More specifically, information corresponding to a function setting request to increase the volume of a ringing tone of the portable cellular phone 1b or to activate/deactivate a vibrator according to a demand of the calling party is additionally inserted into a specific location of the call setting message to be transmitted. The calling party effects insertion of such information by operation of a numeric keypad (push buttons) according to menus indicated on a display of his portable cellular phone 1a. The result of entry by way of the numeric keypad is read by a CPU (omitted from FIG. 2). The specific information addition function is achieved through cooperation among the CPU, ROM, and RAM (omitted from FIG. 2).

At the time of the function setting request addition means 41 adding the information corresponding to a function setting request to the call setting message, the specific information addition means 42 adds to the call setting message specific information which allows settings of the called telephone to be changed on the basis of the function setting request. Specifically, the function setting request addition means 41 additionally inserts a bit, representing specific information, into a specific location of the call setting message to be sent, so that the called telephone can identify the specific information of the calling telephone. Even in this case, the calling party effects insertion of such information by operation of a numeric keypad (push buttons) according to menus indicated on a display of his portable cellular phone 1a. The result of entry by way of the numeric keypad is read by a CPU (omitted from FIG. 2). The specific information addition function is achieved through cooperation among the CPU, ROM, and RAM (omitted from FIG. 2).

The specific information corresponds to a phone number of the calling telephone (hereinafter often referred to as a "calling phone number") or identification information unique to the calling telephone (i.e., ID information). The called telephone allows the function setup to be effected only if the calling telephone has a specific phone number or ID information. The called telephone analyzes the specific information. If the result of such analysis matches a previously-stored phone number or identification information, the calling party is allowed to change the settings of the called telephone. In contrast, if no match exists between the result of the analysis and the previously-stored phone number or identification information, the request to change settings of the called telephone issued by the calling party is refused. Details of the specific information and settings will be described later.

The radio transmission means 43 converts the information containing the call setting message into a radio signal and transmits this radio signal. The transmission antenna 44 transmits the radio signal to a radio transmission path.

When the calling party attempts to increase the volume of the ringing tone of the called portable cellular phone 1b, the calling party sets an increase in the volume of the ringing tone by operation of the numeric keypad according to menus indicated on the display of the portable cellular phone 1a. The function setting request addition means 41 sets bits (i.e., stored in a specific location of the call setting message) representing inclusion of a function setting request and further sets bits representing a specific detail of the request; i.e., an increase in the ringing tone. The specific information addition means 42 adds the phone number or identification information of the portable cellular phone 1a into the call setting message. The radio transmission means 43 converts the call setting message containing the information into a radio signal, and the transmission antenna 44 transmits the radio signal to the radio transmission path. The radio base station 50a shown in FIG. 1 receives and processes the radio signal, and the thus-processed signal is again transmitted by radio from the radio base station 50b by way of the ISDN 51. The called party receives the radio signal by way of the portable cellular phone 1b, thus effecting voice communication.

Figure 3:
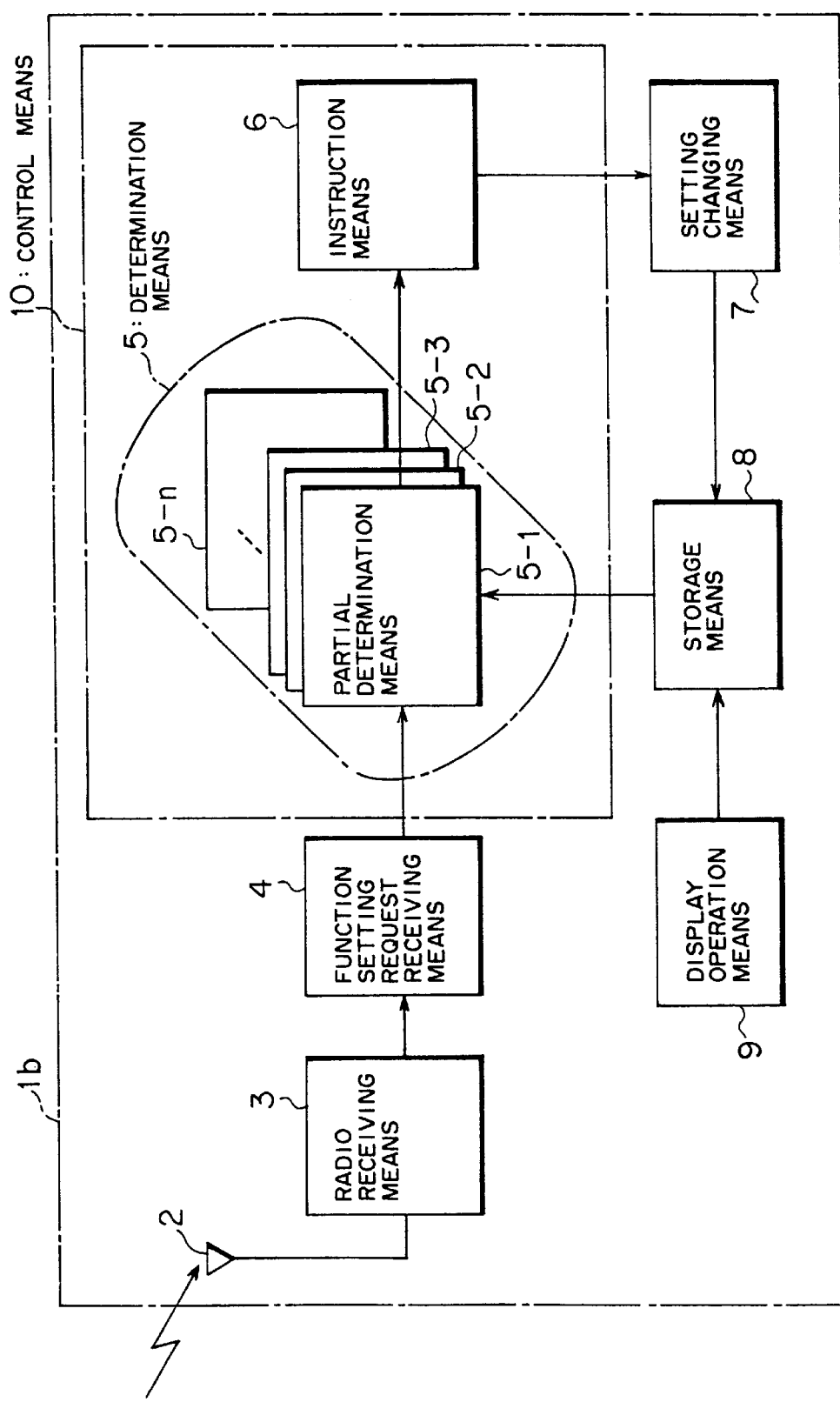
FIG. 3 is a functional block diagram of a called telephone according to one embodiment of the present invention.

FIG. 3 is a functional block diagram of the called telephone (i.e., a telephone whose settings can be changed) according to one embodiment of the present invention. The telephone shown in FIG. 3 (corresponding to the portable cellular phone 1b) comprises a receiving antenna 2, radio receiving means 3, function setting request receiving means 4, storage means 8, display operation means 9, setting changing means 7, and control means 10.

The receiving antenna 2 receives a radio signal, the radio receiving means 3 demodulates the thus-received radio signal and the function setting request receiving means 4 receiving a function setting request which is added to the call setting message and is received from the calling portable cellular phone 1a.

As mentioned previously, the function setting request corresponds to information corresponding to an increase in the volume of the ringing tone of the portable cellular phone 1b or to activation/deactivation of a vibrator. More specifically, the function setting request represents one of the user-to-user information elements stored in the call setting message that is received from the calling party. FIG. 6(a) is a diagram for describing the format of the call setting message. A call setting message (call setting information) 30 shown in FIG. 6(a) is first transmitted to the called telephone in order to establish a communication channel. Incidentally, a received call setting message will be hereinafter referred to as a "call setting message 30". The call setting message 30 comprises a protocol discriminator region, an additional service identifier and call reference region, a type of message region, a bearer capability region, a calling phone number (phone number of calling party) region, and a user-to-user information (setting change request information) region. Brief descriptions of these regions are as follows.

The information stored in the protocol discriminator region represents call control (CC) of a layer 3, and the information stored in the additional service identifier and call reference represents the presence/absence of an option. Further, the additional service identifier and call reference region stores a corresponding call reference value. The information stored in the type of message region represents a call setting (SETUP). Further, the information stored in the bearer capability region represents audio information (sound), and the information stored in the calling phone number represents the phone number of the calling party. The information stored in the user-to-user information region represents setting change request information. FIG. 6(b) is a diagram for describing the format of the user-to-user information, which is stored in a region 30a of the call setting message. The region 30a stores elements relating to the user-to-user information in the area ranging from octet 1(OCTET 1) to octet 5(OCTET 5).

Information items stored in individual octets are now explained. Octet 1 stores an information element identifier representing that a received message corresponds to user-to-user information. Octet 2 stores the length of the information element. The length of the information element represents that the number of information bytes ranging from octet 3 to octet 5 is three bytes (a character "h" of 03h designates a hexadecimal number). Octet 3 stores a setting change request which represents the presence/absence (included/not included) of a setting request from the calling party. If a setting request has been issued by the calling party, bits representing 00000010[bin] are stored. In contrast, if no setting request has been issued by the calling party exists, there are stored bits representing 00000000[bin] are stored (where a character "bin" represents binary digits, and the same applies to any counterparts in the following descriptions). FIG. 6(b) describes only the two lowest-order bits of eight bits of each data unit. Further, octet 4 stores bits representing presence/absence of a ringing tone setting request or a vibrator setting request. A ringing tone setting request is set by the second least significant bit of the octet 4. If a ringing tone setting request has been issued, bits representing 0000001X[bin] are stored. In contrast, if no ringing tone setting request has been issued, bits representing 0000000X[bin] are stored (where "X" represents that the bit may have any value). A vibrator setting request is set by means of the least significant bit of the octet 4. If a vibrator setting request has been issued, bits representing 000000X1[bin] are stored. In contrast, no vibrator setting request has been issued, bits representing 000000X0[bin] are stored. Further, when the ringing tone setting request or the vibrator setting request is written in the octet 4, the octet 5 stores bits representing whether the request corresponds to activation/deactivation of a ringing tone or activation/deactivation of a vibrator. Activation of a ringing tone is represented by 0000001X[bin], and deactivation of the ringing tone is represented by 0000000X[bin]. Further, activation of a vibrator is represented by 000000X1[bin], and deactivation of the vibrator is represented by 000000X0[bin].

The function setting request receiving means 4 of the called portable cellular phone 1b retrieves the user-to-user information region 30a from the received call setting message 30 and examines the region of the octet 3. The function setting request receiving means 4 determines if the bits represent that a setting change request has been issued (i.e., 00000010[bin]) or that no setting change request has been issued (i.e., 00000000[bin]) and outputs the result of such determination.

Turning again to FIG. 3, the storage means 8 reads and writes data, and the display operation means 9 provides the user with indications relating to settings and accepts input operations performed by the user. The setting changing means 7 is capable of changing the settings of the telephone according to the function setting request received by the function setting request receiving means 4, as well as of rewriting the contents of the storage means 8.

In a case where the function setting request is not acceptable, the control means 10 can refuse the request that the setting changing means 7 should change the settings of the telephone by according to the function setting request. The control means 10 comprises determination means 5 and instruction means 6.

More specifically, the determination means 5 determines whether or not the function setting request received by the function setting request receiving means 4 is acceptable. The determination means 5 comprises partial determination means 5-1 to 5-n corresponding to a plurality of function setting requests. If the setting change request received by the function setting request receiving means 4 represents that a setting change request (i.e., 00000010[bin]) has been issued, the determination means 5 determines whether or not the function setting request is acceptable. With regard to criteria for determination, the setting change is effected only when two conditions are satisfied, namely, the setting change request has been issued (00000010[bin]) and the user has already performed an operation for accepting the change. The setting change is not effected under any other conditions.

When the determination means 5 has determined the function setting request to be acceptable, the instruction means 6 allows the setting changing means 7 to change the settings of the telephone according to the function setting request. In contrast, if the determination means 5 has determined the function setting request to be unacceptable, the instruction means 6 can refuse the request that the setting changing means 7 should change the settings of the telephone according to the function setting request.

In a case where the function setting request includes a plurality of requests and where some of the function setting requests are not acceptable, the control means 10 can refuse at least the corresponding requests to change the settings of the telephone by the setting changing means 7 according to the function setting requests. In other words, the determination means 5 comprises the partial determination means 5-1 to 5-n in such a way as to individually determine whether or not each of the function setting requests is acceptable. If the determination means 5 determines some of the function setting requests to be acceptable, the instruction means 6 allows the setting changing means 7 to change the settings of the telephone according to the corresponding function setting requests. In contrast, if the determination means 5 determines some of the function setting requests to be unacceptable, the instruction means 6 can refuse the corresponding requests that the setting changing means 7 should change settings of the telephone according to the corresponding function setting requests.

Figure 4:
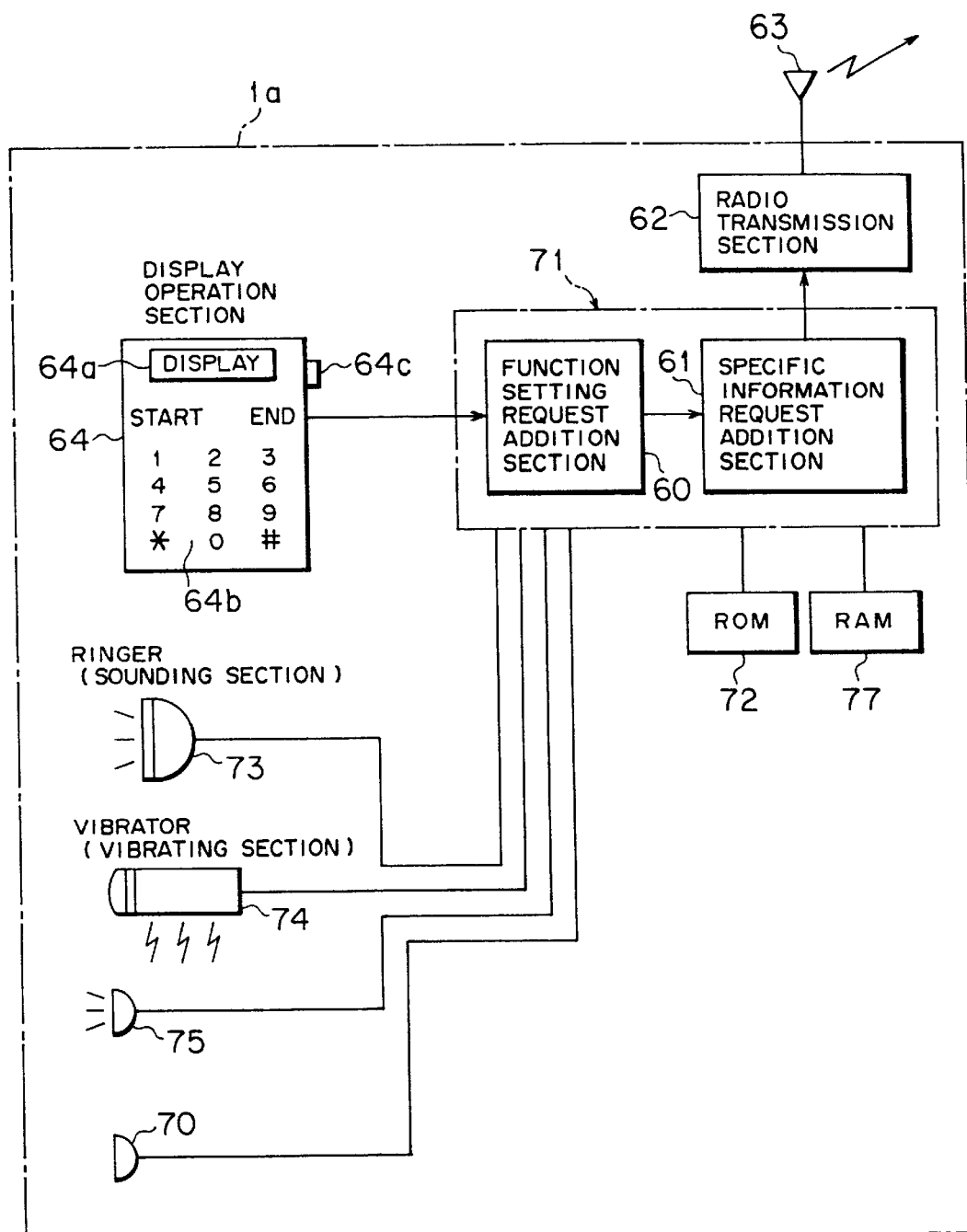
FIG. 4 is a functional block diagram of a portable calling cellular phone according to one embodiment of the present invention.

FIG. 4 is a functional block diagram of a portable calling cellular phone according to one embodiment of the present invention, and FIG. 5 is a functional block diagram of a portable called cellular phone according to one embodiment of the present invention.

FIG. 4 shows, in detail, the configuration of the calling telephone shown in FIG. 2 (i.e., the telephone 1a capable of changing the settings of the called telephone). The calling telephone 1a comprises a display operation section 64, a function setting request addition section (i.e., the function setting request addition means) 60, a specific information request addition section (specific information addition means) 61, a radio transmission section (radio transmission means) 62, and a transmission antenna 63. In terms of hardware configuration, the calling telephone 1a comprises a CPU 71, ROM 72, memory (RAM) 77, a microphone 70, a speaker 75, a ringer (sounding section) 73, a vibrator (vibration section) 74, a display 64a, a numeric keypad (push button) 64b, and switches 64c. The functions of these individual pieces of hardware are publicly known, and their detailed explanations are omitted here.

The display operation section 64 displays menus for prompting the user to perform input operations and accepts the setting information entered by the user. These features of the display operation sections 64 are realized by means of the display 64a (hereinafter often referred to as a "display 64a"), the numeric keypad 64b, and the switches 64c.

The function setting request addition section 60 corresponds to the function setting request addition means 41 and adds, to the call setting message, a function setting request to change the settings of the called telephone (i.e., the portable cellular phone 1b). More specifically, the function setting request addition section 60 additionally inserts, into a specific region of the call setting message to be transmitted, information corresponding to an increase in the volume of a ringing tone of the portable cellular phone 1b or activation/deactivation of the vibrator in response to the request from the calling party. Insertion of such information is effected by operation of the numeric keypad 64b and the switches 64c by the calling party according to the menus indicated on the display 64a. The operations of the numeric keypad 64b and the switches 64c are read by the CPU 71. Addition of a function setting request to the call setting message is effected by cooperation among the CPU 71, the ROM 72, and the RAM 77.

The specific information addition section 61 corresponds to the specific information addition means 42 and adds, to the call setting message, specific information which permits a change in the settings of the called telephone on the basis of the function setting request when the function setting request addition section 60 adds the function setting request to the call setting message. Specifically, the specific information addition section 61 additionally inserts bits, representing specific information, into a specific location of the call setting message to be transmitted. Insertion of such specific information is also effected by operation of the numeric keypad 64b and the switches 64c by the user according to the menus indicated on the display 64a of the portable cellular phone 1a. The operations of the numeric keypad 64b and the switches 64c are read by the CPU 71. Addition of specific information to the call setting message is effected by cooperation among the CPU 71, the ROM 72, and the RAM 77. The specific information corresponds to the phone number of the calling telephone or identifying information unique to the calling telephone (e.g., identification information), and the details will be described later.

Further, the radio transmission section 62 corresponds to the radio transmission means 43, and functions to convert the information included in the call setting message into a radio signal and transmit the thus-converted radio signal. The transmission antenna 63 transmits a radio signal to a radio transmission path.

The calling party performs setting operations such as an increase in the volume of a ringing tone or activation/deactivation of a vibrator by operation of the numeric keypad 64b and the switch 64c according to the menus indicated on the display 64a of the portable cellular phone 1a. In response to the operations, the function setting request addition section 60 sets bits (in a specific location of the call setting message) representing that the function setting request has been issued and also sets bits representing a specific detail of the request; i.e., an increase in the volume of the ringing tone. The specific information addition section 61 adds the phone number of or identification information corresponding to the portable cellular phone 1a into the call setting message. The radio transmission section 62 converts the call setting message including such an information item into a radio signal and transmits the radio signal to the radio transmission path by way of the transmission antenna 63. The radio base station 50a shown in FIG. 1 receives and processes the radio signal, and the resultant signal is again transmitted, by means of radio, from the radio base station 50b by way of the ISDN 51. The called party receives the radio signal by way of the portable cellular phone 1b, thus establishing telephone communication.

FIG. 5 is a functional block diagram of a portable called cellular phone according to one embodiment of the present invention and FIG. 5 shows the detail one of telephone whose settings can be changed, which is shown in FIG. 3 (i.e., the portable cellular phone 1b). The portable cellular phone 1b comprises the receiving antenna 2, a radio receiving section (radio receiving means) 13, a message processing section 26, a setting change allowance/refusal storage section (storage means) 18 and a display operation section (display operation means) 19. In terms of hardware configuration, the portable cellular phone 1b comprises memory (RAM) 18a, CPU 21, ROM 22, a microphone 20, a speaker 25, a ringer (a sounding section) 23, a vibrator (vibration section) 24, the display 19*a*, the numeric keypad 19*b*, and the switches 19*c*. Memory writing means (external input means) 27 is connected to the portable cellular phone 1*b*. The functions of the respective pieces of hardware are publicly known, and hence their detailed descriptions are omitted here for brevity.

The radio receiving section 13 corresponds to the radio receiving means 3, and functions to receive the radio signal transmitted from the radio base station 50*b* by way of the ISDN 51 through use of the receiving antenna 2 and demodulate a control signal and sound data. The radio receiving section 13 is made up of an electronic circuit similar to that of an existing portable cellular phone. Detailed explanation of the radio section is omitted here.

The message processing section 26 analyzes a control signal of a message, such as a call setting message, which is transmitted from the ISDN 51 for the purpose of commencing or terminating voice communication with the calling telephone, and outputs to the individual sections of the portable cellular phone 1*b* instructions required for commencing/terminating voice communications, thereby causing the portable cellular phone 1*b* to perform appropriate operations. The message processing section 26 comprises a control signal analysis section (function setting request receiving means) 14, a control section (control means) 11, and a setting changing section (setting changing means) 17. The features of these elements are implemented by means of the CPU 21, the memory 18*a*, and the ROM 22.

The control signal analysis section 14 corresponds to the function setting request receiving means 4 of the portable cellular phone 1*b* and analyzes the function setting request which is added to the call setting message 30 and is transmitted from the calling portable cellular phone 1*a*. The control section 11 corresponds to the control means 10 of the portable cellular phone 1*b* and comprises a setting change allowance/refusal determination section (i.e., determination means) 15 and an instruction section 16.

Here, the setting change allowance/refusal determination section 15 corresponds to the determination section 5 provided in the control means 10 of the portable cellular phone 1*b* and determines whether or not the function setting request received by the control signal analysis section 14 is acceptable. The setting change allowance/refusal determination section 15 comprises partial determination sections 15-2 to 15-4 so as to correspond to a plurality of function setting requests. Further, the setting changing section 17 corresponds to the setting changing means 7 of the portable cellular phone 1*b* and is capable of changing the settings of the telephone according to the function setting request that is analyzed by the control signal analysis section 14. The instruction section 16 corresponds to the instruction means 6 provided in the control means 10 of the portable cellular phone 1*b*. If the setting change allowance/refusal determination section 15 determines the function setting request to be acceptable, the instruction section 16 allows the setting changing section 17 to change the settings of the telephone according to the function setting request. In contrast, if the setting change allowance/refusal determination section 15 determines the function setting request to be unacceptable, the instruction section 16 can refuse the request that the setting changing section 17 should change settings of the telephone according to the function setting request.

The setting change allowance/refusal storage section 18 provided in the portable cellular phone 1*b* corresponds to the storage means 8 of the portable cellular phone 1*b*, comprises memory 18*a*, and functions to read and write data. The setting change allowance/refusal storage section 18 is arranged so as to store information representing allowance or refusal (the same also applies to any counterparts in the following description), in the form of setting or clearance of specific bits of the memory 18*a*. The function of the setting change allowance/refusal storage section 18 is implemented by non-volatile RAM. The significance of the allowance/refusal bits is as follows.

Figure 7:
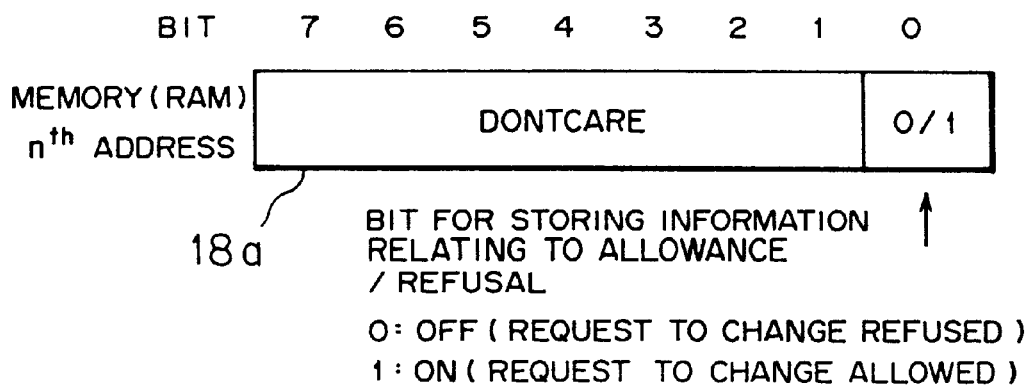
FIG. 7 is a schematic representation for describing a location of memory of the called telephone where allowance/refusal information is set, according to one embodiment of the present invention.

Transmission of only a function setting request in advance by the calling party while information specifying a change in the ringing tone of the ringer 23 of the called telephone or activation/deactivation of the vibrator 24 is included in the function setting request may result in change of the settings of the called telephone without authorization. For instance, a person who is in a peaceful setting, such as a meeting, where a loud ringing tone should be avoided, may be subjected to great inconvenience if the settings of his telephone are changed without authorization. To prevent such an inconvenience, the called telephone is arranged so as to accept or refuse the request to change, as the case may be. For example, the user of the called telephone can unconditionally refuse the request to change settings of his telephone by the calling party, such as a change in the volume of the ringing tone of the ringer 23 or activation/deactivation of the vibrator 24 of the called telephone, rather than unconditionally accepting the request. FIG. 7 is a schematic representation for describing a location of the memory 18*a* of the called telephone where allowance/refusal information is set, according to one embodiment of present invention. The $0^{th}$ bit (the least significant bit, or the bit on the rightmost end of the drawing) shown in FIG. 7 represents allowance/refusal information. If the request to change the settings of the called telephone transmitted from the calling party is acceptable, numeral 1 is stored in the $0^{th}$ bit. In contrast, if the request is unacceptable, numeral 0 is stored in the $0^{th}$ bit. Referring to the allowance/refusal information stored in a predetermined address (or location) in the memory 18*a*, the setting change allowance/refusal determination section 15 shown in FIG. 5 determines whether or not to accept the function setting request. If the allowance/refusal information corresponds to allowance, the settings of the called telephone are effected. Conversely, if the allowance/refusal information corresponds to refusal, the settings of the called telephone are not effected. Consequently, so long as the user of the portable cellular phone 1*b* sets the allowance/refusal information as desired, undesirable changing of the settings of the portable cellular phone 1*b* during a meeting, for example, can be prevented.

Turning again to FIG. 5, the display operation section 19 corresponds to the display operation means 9 of the portable cellular phone 1*b*, and functions to display the menus for prompting the user to perform input operation to receive allowance/refusal settings entered by the user. These functions are implemented by the display 19*a*, the numeric keypad 19*b* and the switches 19*c*. The display operation section 19 performs ordinary displaying operations and reads allowance/refusal of the function setting according to a switching action, such as selection of a menu by pressing one of the switches 19*c*. Further, through pressing of the numeric keypad 19*b*, the display operation section 19 also performs the function of sending instructions to the individual sections constituting the portable cellular phone 1*b*, including the message processing section 26.

The foregoing setting method is based on human-machine interface (HMI). When the user manually enters allowance or refusal into the telephone with regard to the setting request in advance, the resultant allowance/refusal information is stored in the memory 18a. As an alternative to HMI, the input method may be based on a method of storing the allowance/refusal information into the memory 18a by means of the memory writing means 27 from the outside. More specifically, the setting change allowance/refusal storage section (criteria-for-determination means) 18 can set criteria-for-determination information (i.e., the allowance/refusal information) as to whether or not to accept the function setting request through use of the external input means 27, thereby readily effecting complicated setting.

The calling party originates a call through use of the portable cellular phone 1a by addition of the function setting request to the call setting message. The call is received and processed by the radio base station 50a, and the thus-processed signal is transmitted in the form of a radio signal from the radio base station 50b by way of the ISDN 51. This radio signal is received by the receiving antenna 2 of the portable cellular phone 1b, and the thus-received radio signal is demodulated by the radio receiving section 13. The thus-demodulated signal is then delivered to the message processing section 26. The control signal analysis section 14 incorporated in the message processing section 26 extracts the call setting message 30 from the demodulated signal. The user-to-user information region 30a provided in the call setting message 30 is retrieved, and a check is made as to whether or not the setting change request is included. The result of such check is output. The user of the portable cellular phone 1b has selected beforehand setting items, which may be changed by others and setting items which cannot be changed by others. Allowance or refusal is set for each of the thus-selected setting items according to the menus indicated on the display operation section 19. The resultant allowance/refusal information is stored in a predetermined address within the memory 18a by means of the setting change allowance/refusal storage section 18.

The control method employed by the instruction section 16 is as follows. First, from the result of determination as to whether or not a setting change request has been issued and the allowance/refusal information stored in the setting change allowance/refusal storage section 18, the setting change allowance/refusal determination section 15 determines whether or not the setting change request is allowable. When the specific bit of the user-to-user information element stored in the call setting message 30 is set, the bit representing the allowance/refusal information stored in the memory 18a is checked. If the bit is set, the setting changing section 17 changes the settings of the portable cellular phone 1b according to details of a request issued by another user-to-user information element. As a result, the volume of the ringing tone (beep sound) issued from the ringer 23 is made louder or quieter. Further, if the vibrator 24 is switched from a deactivated state to an activated state, the vibrator 24 vibrates when the portable cellular phone 1b receives an incoming call. In contrast, if the vibrator 24 is switched from activation to deactivation, the vibrator 24 does not cause vibration even when the portable cellular phone 1b receives an incoming call. Conversely, if the bit which is stored in the memory 18a and represents allowance/refusal is cleared, the settings of the portable cellular phone 1b are not changed even when the specific bit of the user-to-user information element included in the call setting message 30 is set. Thus, when the called party allows a specific setting, the calling party can set the called telephone from a remote location through use of the calling telephone. Further, the called party can refuse a request to unconditionally change settings by the calling party and selectively allow or refuse a request to change settings.

By means of such a configuration, the calling party performs an operation for changing the settings of the called telephone through use of a calling telephone. In order to prevent unconditional function setting changes, the called party selects acceptable setting change requests from among the setting change requests issued by the calling party, through refusal or allowance, as the case may be. As shown below, there are three types of determination methods ①–③ by which the setting change allowance/refusal determination section 15 allows the function setting request.

① A method of allowing function setting requests received from only calling parties having specific phone numbers.

In this case, when a function setting request is received from a telephone having a specific phone number as specific information, the setting change allowance/refusal determination section 15 determines the function setting request to be acceptable.

② A method of allowing function setting requests received from only calling parties having specific identification information (identification/password).

In this case, when a function setting request is received from a telephone having specific identification information from specific information, the setting change allowance/refusal determination section 15 determines the function setting request to be acceptable.

③ A method of unconditionally allowing setting change requests received from calling parties having specific bit patterns.

More specifically, under this method, without regard to the settings of the called telephone in relation to allowance/refusal of setting change requests, a calling party can forcefully change the settings of the called telephone. When the function setting request is received from a telephone originally assigned specific identification information as specific information, the setting change allowance/refusal determination section 15 determines the function setting request to be acceptable.

In other words, the control section 11 is assigned the previously-described three types of determination methods ①–③ in order to receive a function setting request. When a function setting request is received from the telephone having specific information, the control section 11 is arranged so as to accept the function setting request. According to determination method ①, when a function setting request is received from a telephone having specific telephone information as specific information, the control section 11 is arranged so as to accept the function setting request. According to determination method ②, when a function setting request is received from a telephone having specific identification information as specific information, the control section 11 is arranged so as to accept the function setting request. According to determination method ③, when a function setting request is received from a telephone originally assigned specific identification information as specific information, the control section 11 is arranged so as to accept the function setting request.

The three determination methods ①–③ employ a comparison method for determining whether or not specific information items match each other, as will be described below.

Under the determination method ①, when a setting change request is included in the received call setting message 30, the setting change allowance/refusal determination section 15 compares the calling phone number included in the call setting message 30 with the calling phone number stored in the memory 18a. If a match exists between the calling phone numbers, the settings of the called telephone are changed. If no match exists between the calling phone numbers, the settings of the called telephone are not changed. More specifically, the message processing section 26 shown in FIG. 5 examines the calling phone number included in the call setting message 30. The setting change request is accepted only when the call setting message 30 includes the phone number of a calling party who is allowed to change settings of the called telephone. The phone numbers of parties allowed to change settings are stored in the memory 18*a* in advance by means of HMI or the external memory writing means 27.

Under the determination method ②, when a setting change request is included in the received call setting message 30, the setting change allowance/refusal determination section 15 compares the identification/password information included in the call setting message 30 with the identification/password information stored in the memory 18*a*. If a match exists between the identification/password, the settings of the called telephone are changed. If no match exists between the identification/password, the settings of the called telephone are not changed. More specifically, only when specific identification password information, which represents that the calling party is privileged to change the settings of the called telephone, is included in the call setting message 30 shown in FIG. 6(*a*), the message processing section 26 accepts the setting change request. The identification/password of parties allowed to change settings are stored in the memory 18*a* in advance by means of HMI or the external memory writing means 27.

Under determination method ③, when a setting change request is included in the received call setting message 30, the setting change allowance/refusal determination section 15 changes the settings of the telephone if the call setting message 30 includes information representing that the calling party is assigned a special authorization. Even when the user of the called telephone refuses a request to change settings, the settings of the telephone can be changed unconditionally from a remote location. For example, when two portable cellular phones are purchased as a pair at a sales office, a phone number and identification information are written into each of the two cellular phones. Further, a specific 8-byte bit pattern is written into one of the cellular phones (hereinafter referred to as a "first cellular phone"), and the other cellular phone (hereinafter referred to as a "second cellular phone") is set so as to be able to recognize the specific 8-byte bit pattern. Only when information representing that the calling party is assigned special authorization, is included in the call setting message 30 shown in FIG. 6(*a*) (i.e., when the first telephone is assigned the specific 8-byte bit pattern), the message processing section 26 of the second telephone receives the setting change request. In this case, there is a need to prevent the called party from performing a changing operation by way of the display operation section 19 so as to prevent changing of such a conditional setting by the called party, or to permit changing of settings only through a special operation unknown to a common user.

Acceptance of a setting request is effected according to one of the determination methods ①–③. First, a method by which the calling party performs setting operations is now explained by reference to FIG. 8.

Figure 8:
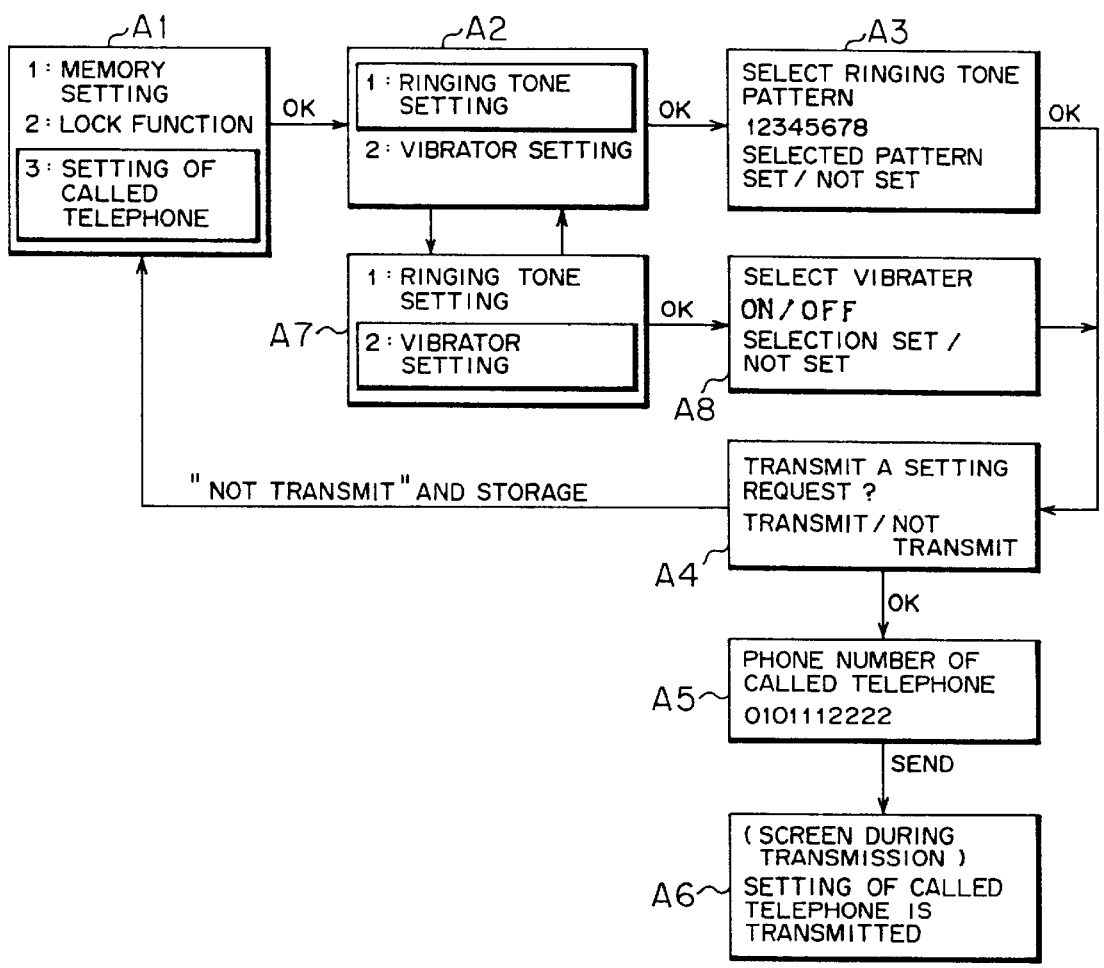
FIG. 8 is a screen transition diagram for describing a method by which a calling party performs setting operations.

FIG. 8 is a screen transition diagram for describing the method by which the calling part performs setting operations. Each of square frames shown in the diagram depicts a window of the display (the display 64*a* shown in FIG. 4). The calling party sets the ringing tone of the ringer 23 of the portable cellular phone (called telephone) 1*b* or activation/deactivation of the vibrator 24 according to screen menus represented by the transition diagram. In step A1, three types of settings; i.e., 1: memory setting, 2: lock function, and 3: setting of called telephone, are displayed. When the calling party selects 3: setting of called telephone, processing proceeds to step A2, where the calling party selects 1: ringing tone setting or 2: vibrator setting. If the calling party selects 1: ringing tone setting, a ringing tone pattern selection screen is indicated in step A3. The calling party selects one from eight ringing tone patterns 1 through 8 and determines whether the thus-selected ringing tone pattern is "SET" or "NOT SET." If the thus-selected ringing tone pattern is set, the calling party is asked to check settings before transmission in step A4. If the calling party selects "TRANSMIT", processing proceeds to step A5, where entry of the phone number of a called telephone is prompted. After entry of the phone number, transmission is commenced (i.e. ,"SEND" is selected). As indicated by step A6, an echo message "setting of called telephone is transmitted" is displayed on the screen display during transmission. If the calling party selects 2: vibrator setting in step A2, the calling party selects 2: vibrator setting in step A7. Further, at step A8 the calling party is required to determine whether to "ON" or "OFF" the vibrator 24 and select "SET" or "NOT SET". If the calling party determines to activate the vibrator 24, processing proceeds to step A4. After step A4, setting procedures following the setting procedure relating to step A4 are the same as those employed in setting the ringing tone. If the calling party selects "NOT TRANSMIT" in step A4, processing again returns to step A1, where setting procedures are performed once again. After the setting has been completed according to such a screen transition, the appropriate radio signal is transmitted.

The calling party transmits the call setting message 30 by way of the ISDN 51 while the setting request information, representing details of changes, is included in the user-to-user information region 30*a* of the call setting message 30, thereby enabling automatic changing of the settings of the called telephone according to the setting request. For example, if the called telephone does not answer an incoming call several times in succession, the calling party can increase the volume of the ringing tone of the ringer 23 or activate the vibrator 24 of the portable cellular phone (called telephone) 1*b*.

Figure 9:
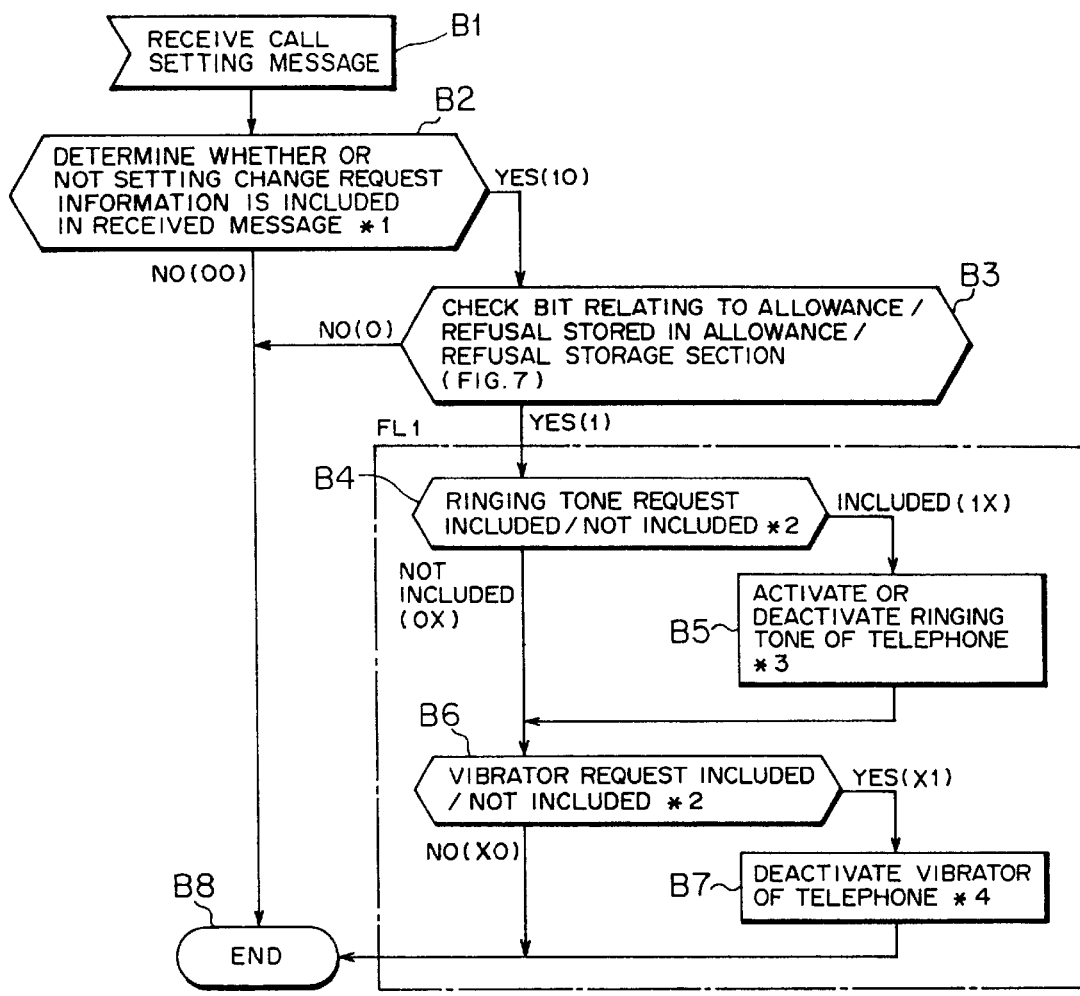
FIG. 9 is a flowchart for describing how a message processing section is controlled.

Control procedures performed by the called telephone will now be described by reference to FIG. 9. FIG. 9 is a flowchart for describing how a message processing section is controlled. A flowchart shown in FIG. 9 shows control procedures performed by the message processing section 26 shown in FIG. 5. When the call setting message 30 is received in step B1 shown in FIG. 9, a determination is made in step B2 as to whether or not the call setting request is included in the received message. As has been described in connection with FIG. 6(*b*), such a determination is made by checking the value of the setting change request of octet 3 in the user-to-user information region 30*a* by the message processing section 26.

If the two lowest-order bits of octet 3 represent "10," in step B2 the message processing section 26 determines the setting change request to be included, and "YES" is selected. In step B3, the message processing section 26 (more specifically, the setting change allowance/refusal determination section 15) makes a determination as to whether or not the setting change request is allowable, by checking the bit stored in the $0^{th}$ bit (i.e., the rightmost bit) of the memory 18*a* shown in FIG. 7. Bit 0 represents "OFF" (i.e., refusal of the request to change), and bit 1 represents "ON" (i.e., allowance of the request to change). In the case of bit 0 (refusal of the request to change), "NO (refusal)" is selected in step B3, thereby terminating the program (step B8). In contrast, in the case of bit 1 (allowance of the request to change), "YES (allowance)" is selected, and setting procedures are performed according to a setting change flowchart FL1 (i.e., steps B4 to B7 shown in FIG. 9).

First, a check is made in step B4 as to whether or not the ringing tone request is included in the received message, by checking the second least significant bit of octet 4 of the user-to-user information region 30*a* shown in FIG. 6(*b*). If this bit is one (the two lowest-order bits are written as "1X" in FIG. 9) , the ringing tone request is determined to be included in the received message, and "INCLUDED" is selected. In step B5, the message processing section 26 checks the value of octet 5 of the user-to-user information region 30*a*. If the bits stored in octet 5 represent 0000001X [bin], the message processing section 26 activates the ringing tone. In contrast, if the bits represent 0000000X[bin], the message processing section 26 deactivates the ringing tone. In contrast, if the second least significant bit of octet 4 of the user-to-user information region 30*a* is 0 (the two lowest-order bits are written as "0X" in FIG. 9), the ringing tone request is determined not to be included in the received message, and "NOT INCLUDED" is selected. In step B6, a check is made as to whether or not the request for setting the vibrator 24 is issued.

In step B6, the message processing section 26 checks the least significant bit of octet 4 of the user-to-user information region 30*a*. If the value of the LSB is 1 (the two lowest-order bits are written as "X1" in FIG. 9) , the vibrator setting request is determined to be included in the received message, and "YES (included)" is selected. In step B7, the message processing section 26 checks the value of octet 5 of the user-to-user information region 30*a*. If the bits stored in octet 5 represent 000000X1[bin], the message processing section 26 activates the vibrator 24. In contrast, if the bits represent 000000X0[bin], the message processing section 26 deactivates the vibrator 24. In contrast, if the least significant bit of octet 4 of the user-to-user information region 30*a* is 0 (the two lowest-order bits are written as "X0" in FIG. 9), the vibrator setting request is determined not to be included in the received message, and "NO (not included) " is selected, thereby terminating the program (step B8).

As mentioned above, if the setting request is stored in the received message, "YES (included)" is selected in step B2), a determination is made as to whether or not the setting request is acceptable. If the setting request is not acceptable, the settings of the telephone are not changed ("NO" is selected in step B3). The called party can unconditionally refuse the request from the calling party. If the setting request is determined to be acceptable, the settings of the telephone can be changed ("YES" is selected in B3). In this case, the called telephone is remotely operated by the calling party. Thus, a setting request can be made, as the case may be, thereby enhancing the convenience of utilization of a telephone.

Figure 10:
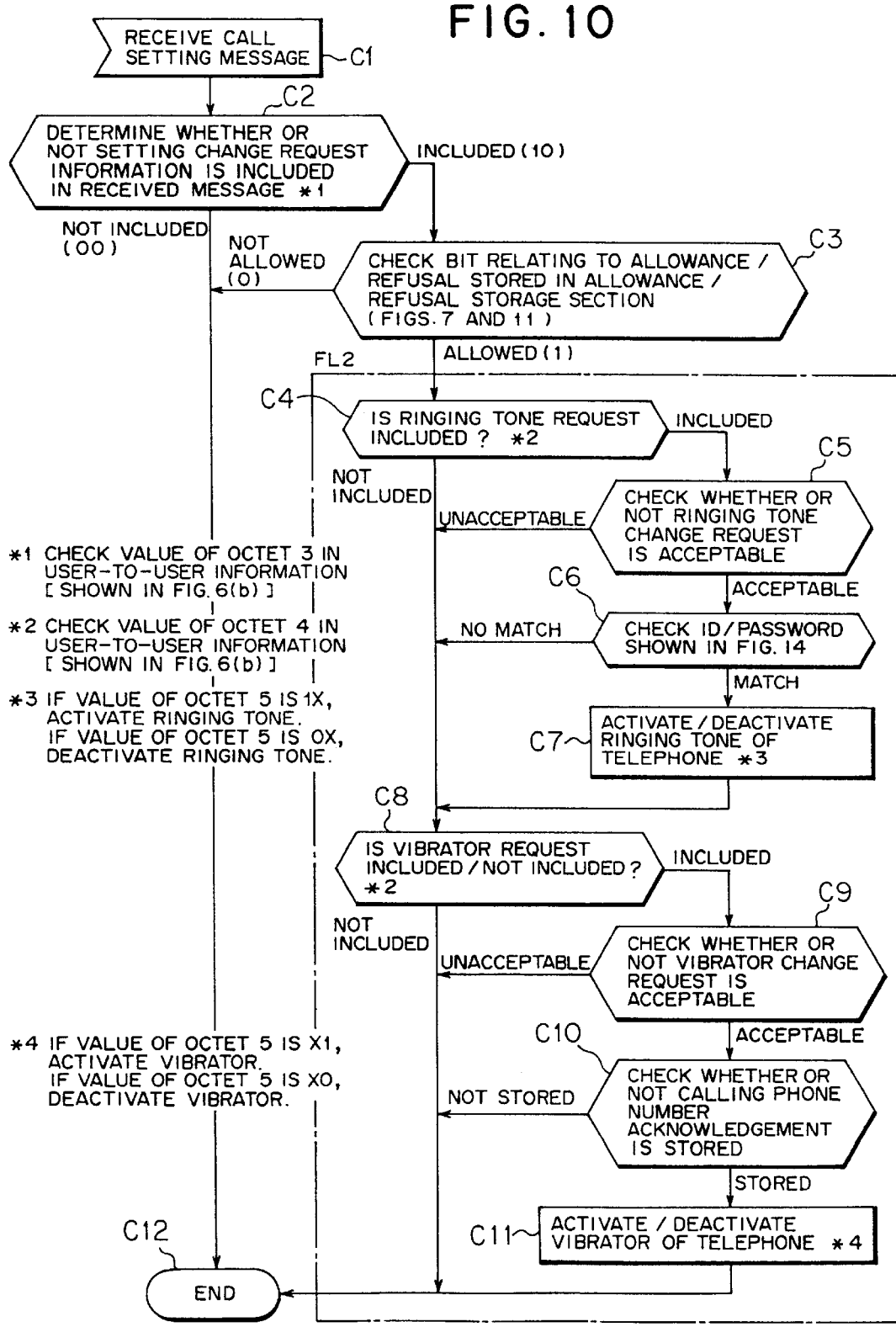
FIG. 10 is a flowchart for describing another control method for the purpose of changing settings of a called telephone according to one embodiment of the present invention.

Another control procedure for the purpose of changing the settings of the called telephone will now be described by reference to FIGS. 10, 11, and 16. FIG. 10 is a flowchart for describing another control method for the purpose of changing settings of a called telephone according to one embodiment of the present invention. A partial flowchart labeled FL2 of the flowchart shown in FIG. 10 is more detailed than the setting change flowchart labeled FL1 shown in FIG. 9.

When the call setting message 30 is received in step C1 shown in FIG. 10, a determination is made in step C2 as to whether or not the call setting request information (call setting request change information) is included in the received message (call setting message 30). Such a determination is made by checking the values of the two lowest-order bits of octet 3 of the user-to-user information region 30*a* by the message processing section 26. If the two lowest-order bits of the setting change request represent "10," in step C2 the message processing section 26 determines the setting change request to be included, and "INCLUDED" is selected. In step C3, the message processing section 26 (more specifically the setting change allowance/refusal determination section 15) makes a first determination as to whether or not the setting change request is allowable. FIG. 11 is a diagram for describing another location of the memory 18*a* of the called telephone where allowance/refusal information is set, according to one embodiment of the present invention. The setting change allowance/refusal determination section 15 checks the bit stored in the $0^{th}$ bit (i.e., the bit assigned reference numeral 18*a*-1) of the memory 18*a* shown in FIG. 11. Bit 0 represents "OFF" (i.e., refusal of the request to change) , and bit 1 represents "ON" (i.e., allowance of the request to change). In the case of bit 0 (refusal of the request to change) "NOT ALLOWED" is selected in step C3, thereby terminating the program (step C12). In contrast, in the case of bit 1 (allowance of the request to change) setting procedures are performed according to the setting change flowchart FL2 (i.e., steps C4 to C11 shown in FIG. 10).

First, a check is made in step C4 as to whether or not the ringing tone request is included in the received message, by checking the second least significant bit of octet 4 of the user-to-user information region 30*a*. If the ringing tone request is determined to be included in step C4, "INCLUDED" is selected. In step C5, a determination is made as to whether or not the ringing tone change request is acceptable. Accordingly, this determination is the second determination, the first being the determination made in step C3. A partial determination section 15-2 of the setting change allowance/refusal determination section 15 checks the bit stored in the first bit of the memory 18*a* shown in FIG. 11. If the bit is 0, the ringing tone change request is determined to be unacceptable. Therefore, "UNACCEPTABLE" is selected. In step C8, a check is made with regard to the setting of the vibrator 24. Here, bit 0 represents "OFF" (i.e., refusal of the request to change), and bit 1 represents "ON" (i.e. allowance of the request to change). Further, in step C5, in the case of bit 1, the ringing tone change request is allowed, and hence "ACCEPTABLE" is selected. Subsequently, in step C6, a partial determination section 15-3 makes a determination as to whether or not the identification/password in the received message is acceptable. This determination is the third determination, the first being the determination made in step C3.

Figure 14:
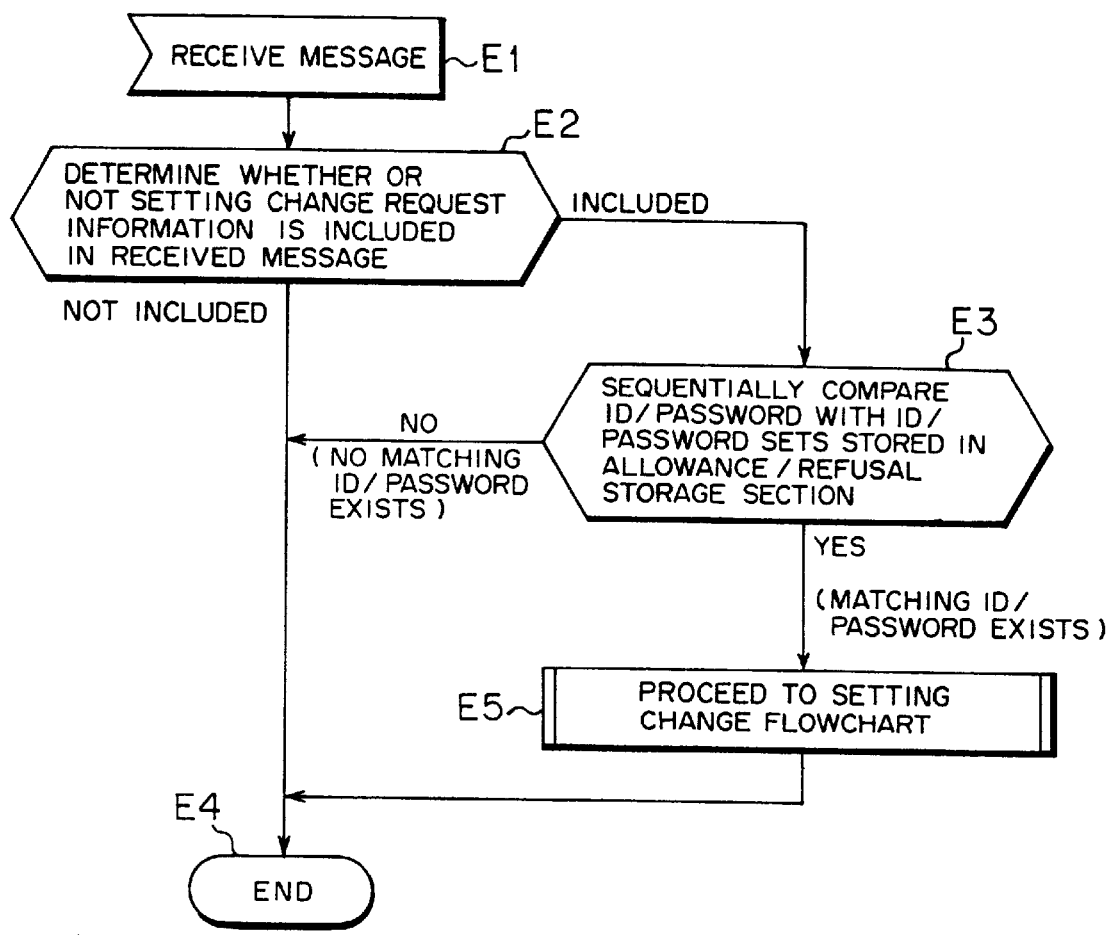
FIG. 14 is a flowchart showing how acceptance or refusal is determined by means of identification information or a password.

FIG. 14 is a flowchart showing how acceptance or refusal is determined by means of identification information or a password. in the received message is acceptable. In step E3 shown in FIG. 14, the identification/password stored in the memory 18*a* is compared with the identification/password included in the received message. FIG. 15 is a diagram for describing information items stored in another location of the memory. And FIG. 15 shows an example storage format when a determination is made as to whether or not identification information is acceptable. FIG. 16 is a diagram for describing the format of the user-to-user information area 30*a* when a determination is made as to whether or not identification information is acceptable. In step E3 shown in FIG. 14, the partial determination section 15-3 of the setting change allowance/refusal determination section 15 sequentially compares an identification (ranging from octets 6 to 12 in FIG. 16) and a password (ranging from octets 13 to 17) stored in the received user-to-user information region 30a shown in FIG. 16 with the identification and password stored in another memory region 18c shown in FIG. 15. For instance, in a case where the identification included in the received message is AAA0000 and the password is !#ABC, the identification and the password match the identification and password stored in the $n^{th}$ address of the memory location 18c shown in FIG. 15. Therefore, the setting change request issued by this calling party is determined to be acceptable.

Turning again to FIG. 10, the identification/password in the received message is also determined to be acceptable in step C6. "MATCH" is selected in step C6. Processing then proceeds to step C7, where the ringing tone of the called telephone is set. In step C7, the message processing section 26 checks the second least significant bit of octet 5 of the user-to-user information region 30a. If the value of the bit is 1, the setting changing section 17 activates the ringing tone. Conversely, if the value of the bit is 0, the setting changing section 17 deactivates the ringing tone. If no match is determined to exist in step C6, "NO MATCH" is selected. In step C8, the setting of the vibrator 24 is checked. More specifically, if the partial determination section 15-3 determines the corresponding function setting request to be acceptable in the third determination, the instruction section 16 of the control section 11 provided in the message processing section 26 allows the setting changing section 17 to change a corresponding setting of the telephone according to the function setting request. In contrast, if the partial determination section 15-3 determines the corresponding function setting request to be unacceptable, the instruction section 16 refuses the request to change the setting of the telephone by the setting changing section 17 according to the function setting request. In this case, the request to change the setting of the ringing tone by the calling party is refused.

As the next phase, the message processing section 26 checks the value of octet 4 of the user-to-user information region 30a in step C8, thereby determining whether or not the vibrator setting request is included in the received message. If the vibrator setting request (vibrator request) is determined in step C8 to be included, "INCLUDED" is selected. In step C9, a fourth determination (the first being the determination made in step C3) is made as to whether or not the vibrator change request is acceptable.

The partial determination section 15-4 of the setting change allowance/refusal determination section 15 checks the bit stored in the second bit (i.e., the bit assigned reference numeral 18a-3) of the memory 18a shown in FIG. 11. If the bit is 1, "ACCEPTABLE" is selected in step C9. In step C10, a check is made as to whether or not a calling phone number acknowledgement is included in the received message. In contrast, if the bit is 0, the vibrator change request is determined in step C9 to be unacceptable. Thereby, "UNACCEPTABLE" is selected, and the program is terminated (step C12). Here, bit 0 represents "OFF" (i.e., refusal of the request to change), and bit 1 represents "ON" (i.e., allowance of the request to change).

The message processing section 26 determines in step C10 whether or not a calling phone number acknowledgement is included in the received message, by checking whether or not a predetermined calling phone number is stored in the calling phone number region of the call setting message 30 shown in FIG. 6(a). If the calling phone number is not stored, "NOT STORED" is selected, and the program is terminated (step C12). In contrast, if the calling phone number is stored, "STORED" is selected, and processing proceeds to step C11. In step C11, the message processing section 26 performs, for the first time, setting of the vibrator 24 disposed in the called portable cellular phone 1b. Specifically, the message processing section 26 checks the least significant bit written in octet 5 of the user-to-user information region 30a. If the bit is 1, the setting changing section 17 activates the vibrator 24. In contrast, if the bit is 0, the setting changing section 17 deactivates the vibrator 24. After activation or deactivation of the vibrator 24, the program is terminated (step C12). More specifically, if the partial determination section 15-4 determines the corresponding function setting request to be acceptable in the determination, the instruction section 16 of the control section 11 provided in the message processing section 26 allows the setting changing section 17 to change a corresponding setting of the telephone according to the function setting request. In contrast, if the partial determination section 15-4 determines the corresponding function setting request to be unacceptable, the instruction section 16 refuses the request to change the setting of the telephone by the setting changing section 17 according to the function setting request.

As mentioned above, when the setting change request is included in the received message (NOT INCLUDED in step C2), a determination is made as to whether or not the setting change request is acceptable. If the setting change request is unacceptable, the setting of the telephone is not changed (NOT ALLOWED in step C3), and the called party can refuse the request to unconditionally change settings by the calling party. In contrast, if the setting change request is acceptable, the setting of the called telephone can be changed (ALLOWED in step C3). Thus, the called telephone is remotely controlled by the calling party.

As mentioned above, a determination as to whether or not a change request is acceptable can be set with regard to the ringing tone of the ringer 23 and activation/deactivation of the vibrator 24, independently (steps C5 and C9 shown in FIG. 10). For example, the ringer 23 and the vibrator 24 can be controlled independently of each other such that changing of the volume of a ringing tone is prevented, and such that changing of the settings of only the vibrator 24 is allowed in very peaceful surroundings.

In addition, allowance conditions can be independently set for each setting item to be changed, such as the ringer 23 and the vibrator 24 (steps C6 and C10 shown in FIG. 10). For example, only the person who knows the identification/password is allowed to change the volume of the ringing tone, but anybody can change the settings of the vibrator 24, so long as he reports a calling phone number. Thus, control more elaborate than the control procedures shown in FIG. 9 becomes feasible, and setting of the telephone can be effected, as the case may be, thereby yielding an advantage of the ability to enhance the convenience of utilization of the telephone.

Further, as mentioned above, in a case where the function setting request comprises a plurality of requests such as a setting request to change the volume of the ringing tone of the ringer 23 and a setting request to activate or deactivate the vibrator 24 (steps C3, C5, C6, and C9), the plurality of partial determination sections 15-2 to 15-4 determine whether or not specific function setting requests are acceptable. If the partial determination sections 15-2 to 15-4 determine the corresponding function setting requests to be acceptable, the instruction section 16 allows the setting changing section 17 to change the corresponding settings according to the function setting requests. In contrast, if the partial determination sections 15-2 to 15-4 determine that the corresponding function setting requests to be unacceptable, the instruction section 16 can refuse the request that the setting changing section 17 should change settings according to the corresponding function setting requests.

The control procedures employed by the message processing section 26 for each of the previously-described determination methods ①–③ will be described by reference to FIGS. 12 to 18.

Figure 12:
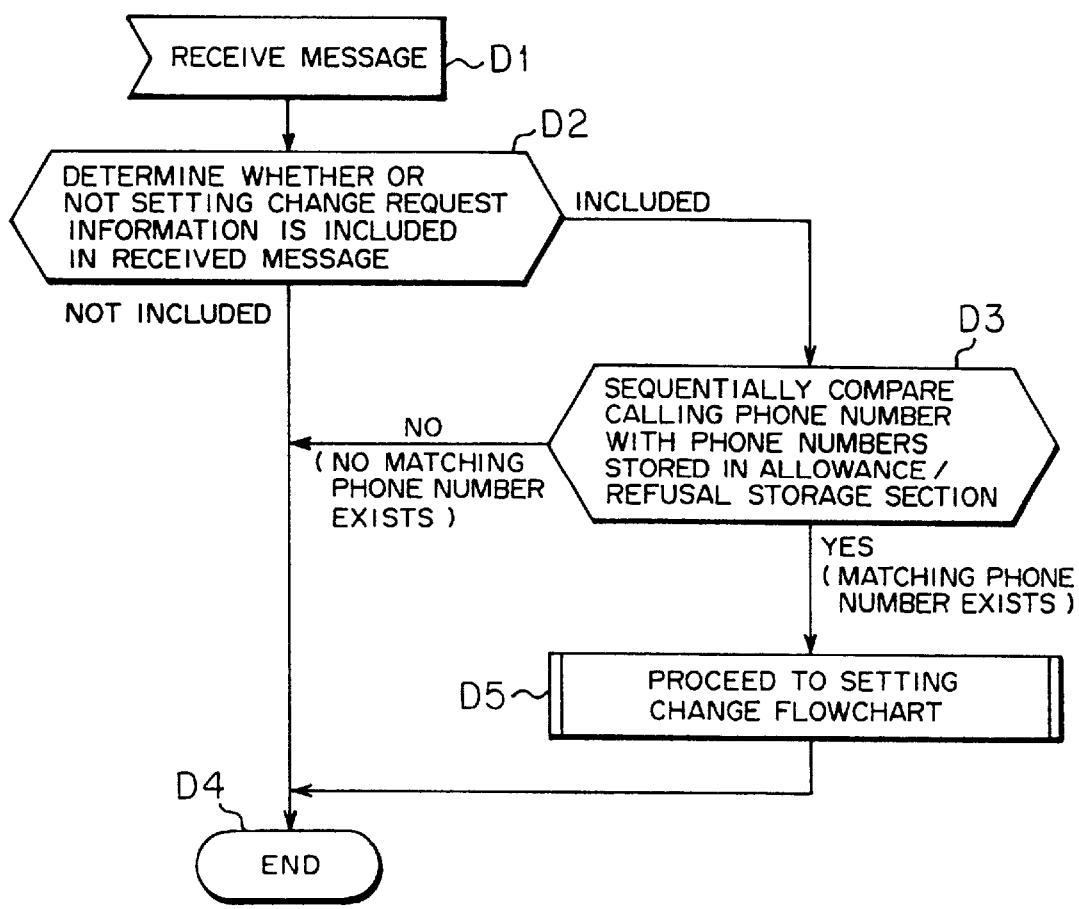
FIG. 12 is a flowchart showing a control scheme for switching between allowance and refusal by reference to a calling phone number.

By reference to FIGS. 12 and 13, there will be given an explanation for the control procedures employed under determination method ①. FIG. 12 is a flowchart showing a control scheme for switching between allowance and refusal by reference to a calling phone number and shows control procedures used when a setting change request is allowed or refused according to a calling phone number. When the call setting message 30 is received in step D1 shown in FIG. 12, the message processing section 26 determines in step D2 whether or not the received message includes a setting change request information. If the setting change request is determined to be included, "INCLUDED" is selected. In step D3, the phone number stored in the calling phone number region within the call setting message 30 [see FIG. 6(a)] is sequentially compared with the phone numbers stored in the memory 18a. If comparison shows that the phone number of the calling party is included, "YES" is selected in step D3 shown in FIG. 12. In step D5, processing is carried out according to the previously-described setting change flowchart FL1 or FL2, whereby the volume of the ringing tone of the ringer 23 or activation/deactivation of the vibrator 24 is changed according to the setting change request. Then, the program is terminated (step D4). If in step D2 the setting change request is determined not to be included in the received message, "NOT INCLUDED" is selected, and the program is terminated. Alternatively, if in step D3 no match among the calling phone numbers is found, "NO" is selected, and the program is terminated (step D4).

Registration of an identification and a password into the setting change allowance/refusal storage section 18 is carried out as follows. First, the user enters the phone number of the person, who is allowed to change settings, according to the menus indicated on the display operation section 19. The setting change allowance/refusal storage section 18 stores into a specific location of the memory region 18b the phone number read by the display operation section 19. FIG. 13 is a diagram for describing information items stored in the memory location 18b and shows an example of storage format when the calling phone number included in the received message is determined to match one of the calling phone numbers registered in the memory location. Provided that one of the three phone numbers "0447771111," "0447401111," and "0377771111" is included as a calling phone number information element in the call setting message 30 of the received message, the calling phone number is compared, in step D3 shown in FIG. 12, with the phone number stored in the memory location 18b shown in FIG. 13. Since comparison shows that a match exists, the calling phone number information is determined to be acceptable in step D3 (i.e., "MATCHING PHONE NUMBER EXITS"). When there occurs an incoming call from a calling party whose phone number is different from the phone numbers of the persons who are allowed to change settings (i.e., "NO MATCHING PHONE NUMBER EXITS"), the setting change allowance/refusal storage section 18 determines the change request of the incoming call to be refused. Hence, settings of the called telephone are not changed. A plurality of phone numbers can be stored in a memory location 18b shown in FIG. 13. Address numbers are assigned to the memory location 18b for convenience of explanation, and hence the intervals among the addresses are not limited to those shown in FIG. 13.

As mentioned above, in a case where the call setting change request is included in the received call setting message 30, if the function setting request is received from the telephone having specific information, the call setting change allowance/refusal determination section 15 determines the function setting request to be acceptable. Specifically, if the telephone from which the function setting request is received has a specific phone number as specific information, the setting change allowance/refusal determination section 15 determines the function setting request to be acceptable. The setting change allowance/refusal determination section 15 compares the calling phone number stored in the call setting message 30 with the calling phone numbers stored in the memory location 18b. If comparison shows that a match exists, settings of the telephone are changed. In contrast, if no match is found, settings of the telephone are not changed. As a result, the request to change settings from the calling party can be allowed or refused on the basis of the calling party, and hence the called party can prevent an undesired request to change settings issued by the calling party.

As mentioned above, when the telephone from which a function setting request is received has specific information, the control section 11 allows the function setting request. In other words, when the telephone from which a function setting request is received has a specific phone number as specific information, the control section 11 allows the function setting request.

Next, by reference to FIGS. 14 to 16, there will be given an explanation of the control procedures employed under determination method ②. FIG. 14 is a flowchart showing how acceptance or refusal is determined by means of identification information or a password. When the call setting message 30 is received in step E1 shown in FIG. 14, the message processing section 26 determines in step E2 whether or not the received message includes a setting change request. If the setting change request is determined to be included, "INCLUDED" is selected. In step E3, the message processing section 26 sequentially compares the identification (AAA0000) written in octets 6 to 12 and the password (!#ABC) written in octets 13 to 17 as shown in FIG. 16, both being sent from the calling party, with identification/password sets (AAA0000/!#ABC or AAB0001/ABC##). If comparison shows that a match exists, the call setting change request is determined to be acceptable and "YES" is selected. In contrast, if comparison shows no matching identification/password set, "NO" is selected. Only calling parties having the identification/password sets AAA0000/!#ABC and AAAB0001/ABC## are allowed to change the settings of the called telephone. In step E5 shown in FIG. 14, processing is carried out according to the previously-described setting change flowchart FL1 or FL2, whereby a change in the volume of the ringing tone of the ringer 23 or activation/deactivation of the vibrator 24 is effected according to the setting change request. Then, the program is terminated (step E4).

If in step E2 the setting change request is determined not to be included in the received message, "NOT INCLUDED" is selected, and the program is terminated. Alternatively, if comparison in step E3 shows no matching identification/password exits, "NO" is selected, and the program is terminated (step E4). A plurality of identification/password sets can be stored in a memory location 18c shown in FIG. 15. Address numbers are assigned to the memory location 18c for convenience of explanation, and hence the intervals among the addresses are not limited to those shown in FIG. 15.

The identification/password of the calling party allowed to change settings (hereinafter referred to as an "authorized calling party") is registered as follows. The user performs entry operations in advance according to the menus indicated on the display operation section 19, so that the setting change allowance/refusal storage section 18 stores the identification and the password of the authorized calling party read by the display operation section 19 into a specific position of the memory location 18c. When a setting change request received from a calling party whose identification and password differ from those of the authorized calling parties, the request is determined to be unacceptable, so that settings of the called telephone are not changed.

As mentioned above, when the telephone from which function setting request is received has specific identification information as specific information, the setting change allowance/refusal determination section 15 determines the function setting request to be acceptable. More specifically, when the setting change request is included in the received call setting message 30, the setting change allowance/refusal determination section 15 compares the identification/password information stored in the call setting message 30 with the identification/password information sets stored in the memory location 18c. If comparison shows a match exists, the settings of the called telephone are changed. In contrast, no match is found, the settings of the called telephone are not changed. Thus, the setting change request from the calling party can be allowed or refused on the basis of identification, and hence the user of the called telephone can prevent undesired changing of settings. Specific identification/passwords sets can be assigned to a plurality of users, thereby enabling a plurality of users to write data into the setting change allowance/refusal storage section 18. Further, when the telephone from which a function setting request is received has specific identification information as specific information, the control section 11 allows the function setting request.

Figure 17:
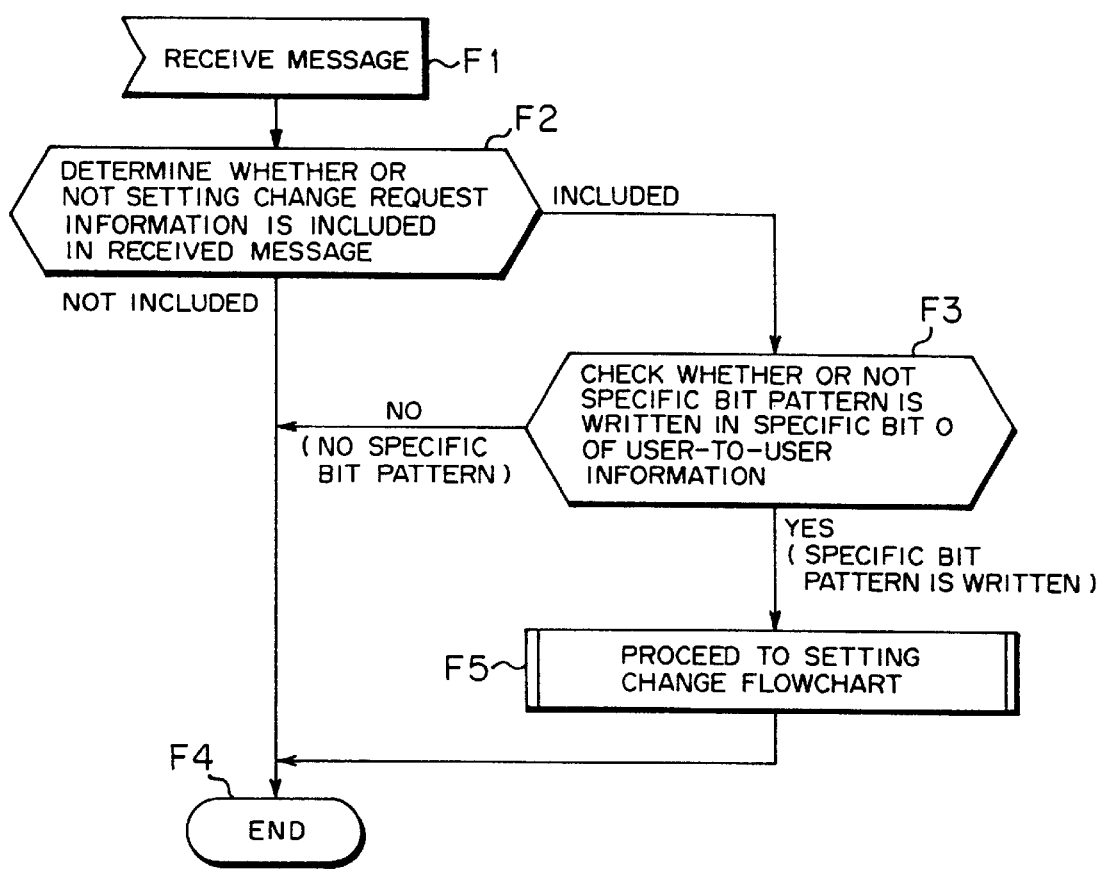
FIG. 17 is a flowchart showing control procedures used by a message processing section when a privileged calling party is allowed to change settings unconditionally.

By reference to FIGS. 17 and 18, there will now be given an explanation for the control procedures employed under determination method ③. FIG. 17 is a flowchart showing control procedures used by the message processing section 26 when a privileged calling party is allowed to change settings unconditionally. FIG. 18 is a diagram for describing the format of the user-to-user information region 18a when privileged changing is set. When the call setting message 30 is received in step F1 shown in FIG. 17 (step F1), in step F2 the message processing section 26 determines whether or not a setting change request is included in the received message. If the setting change request is determined to be included, "INCLUDED" is selected. In step F3, the message processing section 26 checks whether or not a specific 8-byte bit pattern is written into octets 6 through 13 of the user-to-user information region 30a (see FIG. 18). If in step F3 the specific 8-byte bit pattern is determined to be written in octets 6 through 13, the message processing section 26 determines the specific bit pattern to be written, and "YES" is selected. Processing is carried out in accordance with the setting change flowchart FL1 or FL2 in step F5, and changing of the volume of the ringing tone of the ringer 23 or activation/deactivation of the vibrator 24 is effected according to the setting change request. Then, the program is terminated (step F4). If the setting change request is determined not to be included in step F2, "NOT INCLUDED" is selected, and the program is terminated. Alternatively, if the specific bit pattern is determined not to be written in step F3, "NO" is selected, and the program is terminated (step F4).

In step F3, a bit pattern is checked in the following manner. Specifically, values written in octet 6 through octet 13 of the user-to-user information region 30a shown in FIG. 18 are read, and a check is made as to whether or not a specific 8-byte bit pattern (e.g., 1A2B596BF3EE9F03 in hexadecimal) is written. If a match exists between the bit patterns, the message processing section 26 determines that the calling party who transmitted the bit pattern is privileged to change settings. Therefore, the specific bit pattern is determined to be written in step F3 (i.e., SPECIFIC BIT PATTERN IS WRITTEN). Conversely, if the setting change request is determined not to be included in step F3, "NO" is selected, and the program is terminated (step F4).

As mentioned above, when the telephone from which a function setting request is received has previously been assigned specific identification information as specific information, the setting change allowance/refusal determination section 15 determines the function setting request to be acceptable. If the received call setting message includes both the setting change request and the information representing that the calling party is privileged, the setting change request is unconditionally allowed. When the telephone from which a function setting request is received has previously been assigned specific identification information as specific information, the control section 11 allows the function setting request. In this case, if the user changes the criteria for determining a privilege, unconditional writing cannot be effected. Therefore, the user is prevented from changing the criteria by way of the display operation section 19, or the criteria may be changed only by means of an operation unknown to an ordinary user.

For example, in a case where a parent and his child purchase a pair of portable cellular phones, a specific bit pattern, representing that the user is privileged to change settings, is written into the parent's portable cellular phone at a sales office. Even if the child sets his cellular phone so as to refuse a request to change settings, the parent can forcefully change the settings of the child's portable cellular phone.

More specifically, when the parent makes a phone call to his child, even if the child sets his phone so as to refuse a request to change settings, the child's phone recognizes a received message including information which represents that the calling party is privileged. As a result, the parent can forcefully change settings of the child's portable cellular phone.

Thus, even if the user of the called telephone sets his phone so as to refuse a request to change settings, the user of the calling telephone can forcefully overwrite data into the called telephone.

(B) Others

The present invention is not limited to the previously-described embodiments and can be modified in various manners within the scope of the present invention. For example, the present invention may be embodied in various manner by changing a bit position in each of regions of the call setting message 30, the method of padding (or extracting) information, and a logical expression for allowing or refusing a request in individual flowcharts. Setting items may be added and may include items other than volume of a ringing tone, the melody of a ringing tone, and activation/deactivation of the vibrator 24, as required.

In the previous embodiment, both the calling and called telephones are radiotelephones. Needless to say, the present invention can be embodied through use of stationary telephones. Further, although the previous embodiment employs the ISDN 51, the present invention can be embodied through use of another network, such as a portable cellular phone network or a personal-handy phone system network, so long as the network permits exchange of control signals such as the call setting message 30.

What is claimed is:

1. A telephone whose settings can be changed, comprising:

function setting request receiving means for receiving from the calling telephone a function setting request added to call setting information;

setting changing means capable of changing setting details according to the function setting request received by the function setting request receiving means; and control means capable of refusing the function setting request to change the settings received from the setting changing means, when the function setting request is not acceptable.

2. The telephone as defined in claim 1, wherein the control means is configured so as to allow a function setting request when the function setting request is transmitted from a telephone having specific information.

3. The telephone as defined in claim 2, wherein the control means is configured so as to allow a function setting request when the function setting request is transmitted from a telephone having a specific phone number as specific information.

4. The telephone as defined in claim 2, wherein the control means is configured so as to allow a function setting request when the function setting request is transmitted from a telephone having specific identification information as specific information.

5. The telephone as defined in claim 2, wherein the control means is configured so as to allow a function setting request when the function setting request is transmitted from a telephone which has previously been given specific identification information as specific information.

6. The telephone as defined in claim 1, wherein in a case where the function setting request comprises a plurality of setting requests and where some of the individual function setting requests are not acceptable, the control means is configured so as to refuse requests that the setting changing means should change settings according to the corresponding function setting requests.

7. The telephone as defined in claim 1, further comprising criteria-for-evaluation setting means which sets, by use of external input means, criteria-for-evaluation information as to whether or not the function setting request is allowed.

8. A telephone capable of changing settings of a called telephone, comprising:

function setting request addition means for adding to call setting information a function setting request for changing the settings of the called telephone; and specific information addition means which, upon addition of the function setting request by the function setting request addition means, adds to the call setting information specific information capable of allowing changing of settings of the called telephone on the basis of the function setting request.

* * * * *